(12) United States Patent
Bolbenes et al.

(10) Patent No.: US 11,231,932 B2
(45) Date of Patent: Jan. 25, 2022

(54) TRANSACTIONAL RECOVERY STORAGE FOR BRANCH HISTORY AND RETURN ADDRESSES TO PARTIALLY OR FULLY RESTORE THE RETURN STACK AND BRANCH HISTORY REGISTER ON TRANSACTION ABORTS

(71) Applicant: Arm Limited, Cambridge (GB)

(72) Inventors: Guillaume Bolbenes, Antibes (FR); Albin Pierrick Tonnerre, Nice (FR); Houdhaifa Bouzguarrou, Valbonne (FR)

(73) Assignee: Arm Limited, Cambridge (GB)

( * ) Notice: Subject to any disclaimer, the term of this patent is extended or adjusted under 35 U.S.C. 154(b) by 164 days.

(21) Appl. No.: 16/292,454

(22) Filed: Mar. 5, 2019

(65) Prior Publication Data
US 2020/0285476 A1    Sep. 10, 2020

(51) Int. Cl.
*G06F 9/30* (2018.01)
*G06F 9/38* (2018.01)
(Continued)

(52) U.S. Cl.
CPC .......... *G06F 9/3806* (2013.01); *G06F 9/3013* (2013.01); *G06F 9/3842* (2013.01);
(Continued)

(58) Field of Classification Search
CPC ....... G06F 9/3842; G06F 9/3861; G06F 9/528
See application file for complete search history.

(56) References Cited

U.S. PATENT DOCUMENTS 9,152,509 B2 * 10/2015 Diestelhorst ........ G06F 9/30087
2010/0161951 A1 * 6/2010 Chiou ................. G06F 9/30054
712/240

(Continued)

*Primary Examiner* — Jacob Petranek
(74) *Attorney, Agent, or Firm* — Nixon & Vanderhye P.C.

(57) ABSTRACT

An apparatus and method are provided for handling prediction information. The apparatus has processing circuitry for performing data processing operations in response to instructions, the processing circuitry comprising transactional memory support circuitry to support execution of a transaction comprising a sequence of instructions. Prediction circuitry is used to generate predictions in relation to instruction flow changing instructions, and prediction storage is provided to store a plurality of items of prediction information that are referenced by the prediction circuitry when generating the predictions. The items of prediction information maintained by the prediction storage change based on the instructions being executed by the processing circuitry. A recovery storage is activated by the transactional memory support circuitry at a transaction start point to store a restore pointer identifying a chosen location in the prediction storage. Between the transaction start point and the transaction end point, the recovery storage receives any item of prediction information removed from the prediction storage that was present in the prediction storage at the transaction start point. In response to the transaction being aborted, the restore pointer is used in order to discard from the prediction storage any items of prediction information added to the prediction storage after the transaction start point, and in addition any items of prediction information stored in the recovery storage are stored back into the prediction storage. This can significantly improve prediction accuracy in systems that may need to retry transactions due to a transaction abort, without requiring the entire prediction storage state to be captured at the transaction start point.

16 Claims, 16 Drawing Sheets

A TO G ARE ITEMS OF PREDICTION INFORMATION
(HISTORY INFORMATION) INDICATIVE OF INSTRUCTION FLOW
FOR PREVIOUSLY ENCOUNTERED BRANCH INSTRUCTIONS

(51) Int. Cl.
*G06N 5/02* (2006.01)
*G06F 9/52* (2006.01)

(52) U.S. Cl.
CPC ............ *G06F 9/3861* (2013.01); *G06F 9/528* (2013.01); *G06N 5/02* (2013.01)

(56) References Cited

U.S. PATENT DOCUMENTS

| | | | |
|---|---|---|---|
| 2015/0363203 A1* | 12/2015 | Lipasti | G06F 9/3848 |
| | | | 712/240 |
| 2017/0161095 A1* | 6/2017 | Horsnell | G06F 9/467 |
| 2017/0168828 A1* | 6/2017 | Bonanno | G06F 9/3804 |
| 2018/0300159 A1* | 10/2018 | Gschwind | G06F 9/3863 |
| 2018/0336037 A1* | 11/2018 | Barrick | G06F 9/30098 |
| 2019/0235869 A1* | 8/2019 | Gschwind | G06F 9/467 |

\* cited by examiner

STEP 105 OF FIG. 3 FOR RETURN STACK EXAMPLE

STORE AS RESTORE POINTER IN RECOVERY STORAGE THE CURRENT WRITE POINTER FOR THE STACK (IDENTIFIES LOCATION IN STACK ASSOCIATED WITH MOST RECENTLY ADDED RETURN ADDRESS). MARK ALL ENTRIES CONTAINING VALID RETURN ADDRESSES AS RECOVERABLE — 580

FIG. 13

TRANSACTIONAL RECOVERY STORAGE FOR BRANCH HISTORY AND RETURN ADDRESSES TO PARTIALLY OR FULLY RESTORE THE RETURN STACK AND BRANCH HISTORY REGISTER ON TRANSACTION ABORTS

BACKGROUND

The present disclosure relates to a technique for handling prediction information used when making predictions in relation to instruction flow changing instructions in a system employing transactional memory.

A data processing system may execute a number of threads of data processing. The threads may be executed on the same processing unit, or on separate processing units within the data processing system. Sometimes, the threads may need to access a shared resource and the nature of the data processing operations may be such that once a thread starts interacting with the shared resource, it may be necessary for a set of operations to complete atomically using the resource without another thread accessing the resource in the meantime.

Rather than employing lock-based mechanisms to control exclusive access to at least one target resource in such situations, a technique which has been developed for handling conflicts between threads accessing shared resources involves the use of transactional memory support. In particular, a data processing system may be provided with transactional memory support circuitry to support execution of a transaction, the transaction comprising a sequence of instructions executed speculatively and for which the processing circuitry is configured to prevent commitment of results of the speculatively executed instructions until the transaction has reached a transaction end point. If it becomes necessary to abort the transaction before the transaction end point is reached, for example because another thread is performing a conflicting access, then it is necessary to be able to restore the state of the processor to the state that existed before the transaction started.

This can cause some issues with regard to the prediction information used when making predictions in relation to instruction flow changing instructions, since if the prediction information present at the time a transaction starts is modified during performance of the transaction, and the transaction ultimately aborts, then this can adversely affect prediction accuracy when the transaction is retried.

SUMMARY

In accordance with one example arrangement, an apparatus is provided comprising: processing circuitry to perform data processing operations in response to instructions, the processing circuitry comprising transactional memory support circuitry to support execution of a transaction, the transaction comprising a sequence of instructions executed speculatively and for which the processing circuitry is configured to prevent commitment of results of the speculatively executed instructions until the transaction has reached a transaction end point; prediction circuitry to generate predictions in relation to instruction flow changing instructions, with the generated predictions being used to determine the instructions fetched for execution by the processing circuitry; prediction storage to store a plurality of items of prediction information that are referenced by the prediction circuitry when generating the predictions, wherein the items of prediction information maintained by the prediction storage change based on the instructions being executed by the processing circuitry; and a recovery storage activated by the transactional memory support circuitry at a transaction start point to store a restore pointer identifying a chosen location in the prediction storage, and between the transaction start point and the transaction end point to receive any item of prediction information removed from the prediction storage that was present in the prediction storage at the transaction start point; wherein the transactional memory support circuitry is responsive to the transaction being aborted to reference the restore pointer in order to discard from the prediction storage any items of prediction information added to the prediction storage after the transaction start point, and to store back into the prediction storage any items of prediction information stored in the recovery storage.

In accordance with the second example arrangement, a method of handling prediction information is provided, comprising: employing processing circuitry to perform data processing operations in response to instructions, the processing circuitry comprising transactional memory support circuitry to support execution of a transaction, the transaction comprising a sequence of instructions executed speculatively and for which the processing circuitry is configured to prevent commitment of results of the speculatively executed instructions until the transaction has reached a transaction end point; generating predictions in relation to instruction flow changing instructions, with the generated predictions being used to determine the instructions fetched for execution by the processing circuitry; storing in prediction storage a plurality of items of prediction information that are referenced when generating the predictions, wherein the items of prediction information maintained by the prediction storage change based on the instructions being executed by the processing circuitry; activating a recovery storage at a transaction start point to store a restore pointer identifying a chosen location in the prediction storage, and between the transaction start point and the transaction end point to receive any item of prediction information removed from the prediction storage that was present in the prediction storage at the transaction start point; and in response to the transaction being aborted, causing the transactional memory support circuitry to reference the restore pointer in order to discard from the prediction storage any items of prediction information added to the prediction storage after the transaction start point, and to store back into the prediction storage any items of prediction information stored in the recovery storage.

In accordance with a still further example arrangement, an apparatus is provided comprising: processing means for performing data processing operations in response to instructions, the processing means comprising transactional memory support means for supporting execution of a transaction, the transaction comprising a sequence of instructions executed speculatively and for which the processing means is configured to prevent commitment of results of the speculatively executed instructions until the transaction has reached a transaction end point; prediction means for generating predictions in relation to instruction flow changing instructions, with the generated predictions being used to determine the instructions fetched for execution by the processing means; prediction storage means for storing a plurality of items of prediction information that are referenced by the prediction means when generating the predictions, wherein the items of prediction information maintained by the prediction storage means change based on the instructions being executed by the processing means; and a recovery storage means, activated by the transactional memory support means at a transaction start point, for storing a restore pointer identifying a chosen location in the prediction storage means and, between the transaction start point and the transaction end point, for receiving any item of prediction information removed from the prediction storage means that was present in the prediction storage means at the transaction start point; wherein the transactional memory support means is responsive to the transaction being aborted to reference the restore pointer in order to discard from the prediction storage means any items of prediction information added to the prediction storage means after the transaction start point, and to store back into the prediction storage means any items of prediction information stored in the recovery storage means.

BRIEF DESCRIPTION OF THE DRAWINGS

The present technique will be described further, by way of illustration only, with reference to examples thereof as illustrated in the accompanying drawings, in which:

FIG. 13 illustrates how the earlier described FIG. 3 may be modified when implementing the return stack example, in accordance with one implementation.

DESCRIPTION OF EXAMPLES

Figure 1:
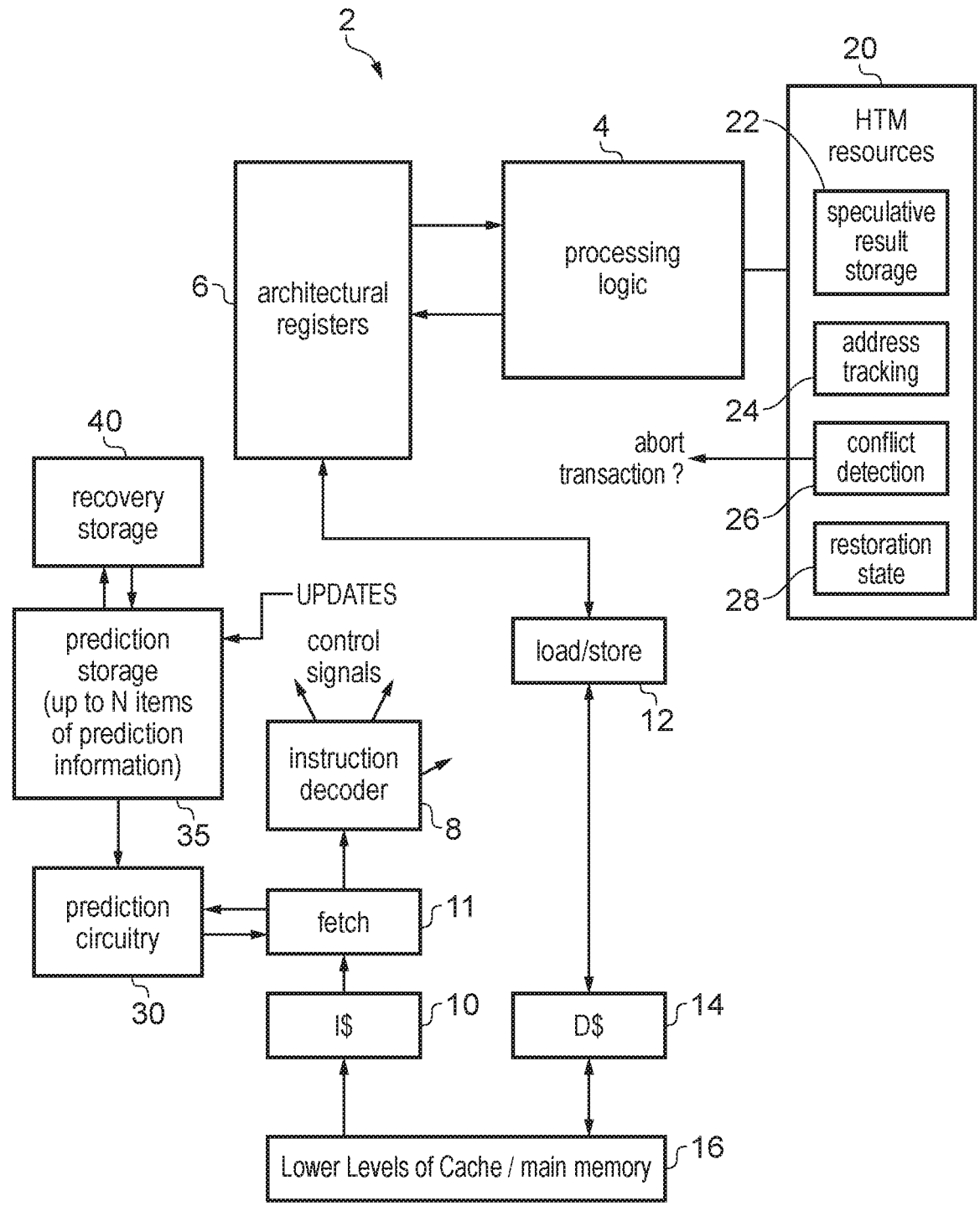
FIG. 1 is a block diagram of a data processing system in accordance with one example.

In one example arrangement, an apparatus is provided that has processing circuitry for performing data processing operations in response to instructions. The processing circuitry comprises transactional memory support circuitry to support execution of a transaction, the transaction comprising a sequence of instructions executed speculatively and for which the processing circuitry is configured to prevent commitment of results of the speculatively executed instructions until the transaction has reached a transaction end point.

By employing a transactional memory architecture, this allows atomic and strongly isolated execution of blocks of instructions forming a transaction. The atomicity ensures that a transaction is seen by other threads (which may also be referred to as agents) as one operation, and the isolation ensures the strict separation between transactional and non-transactional code. Hence, systems employing transactional memory architectures can allow access to a data structure whose composition is dynamic in nature in a way that enables a set of operations to complete atomically using the data structure without a requirement to use locking mechanisms or the like.

There are two ways in which a transaction may finish. Firstly, the transaction may reach a defined transaction end point, meaning that the transaction can be committed, in that execution has been performed atomically and in a strongly isolated manner. However, alternatively the transaction may be aborted, in a situation where the hardware can not ensure the atomicity or the strong isolation of the transactional code, for example due to a conflicting access by another thread to one of the shared resources. Hence, in the case of an abort of the transaction, the previous state before execution of the transactional code needs to be restored, this comprising the processer's registers and the data at the memory locations modified by the transaction (i.e. those in the write set of the transaction). The transactional memory support circuitry can be used to store that previous state so as to enable it to be restored on a transaction abort.

In the examples discussed herein, the apparatus also has prediction circuitry for generating predictions in relation to instruction flow changing instructions, such as branch instructions, with the generated predictions being used to determine the instructions fetched for execution by the processing circuitry. Prediction storage is used to store a plurality of items of prediction information that are referenced by the prediction circuitry when generating the predictions, wherein the items of prediction information maintained by the prediction storage change based on the instructions being executed by the processing circuitry. Since the information maintained within the prediction storage changes as instructions are executed, this can cause issues if a transaction aborts, and hence the instructions forming that transaction need to be retried. In particular, when retrying a transaction, the changed state of the prediction storage can significantly impact the prediction accuracy, hence having a significant impact on performance.

However, the quantity of information maintained within the prediction storage can be relatively large, and hence providing the transactional memory support circuitry with sufficient storage to enable it to take a snapshot of the entire prediction storage contents at the start of a transaction can be very expensive in terms of area and performance, and also can incur significant power consumption at the beginning of a transaction even if the transaction turns out to be executed successfully, and hence there was in fact no need to store that prediction storage information. As an alternative, it could be decided to turn off prediction using the prediction storage during performance of a transaction, but it will be appreciated that such a measure is likely to have a significant performance impact, by increasing the time taken to execute the transaction.

In accordance with the techniques described herein, an iterative mechanism is described that allows the prediction information held within the prediction storage at the start of the transaction to be progressively captured during the transaction so as to enable that information to later be restored back to the prediction storage in the event of a transaction abort. In particular, in accordance with the techniques described herein the apparatus further has a recovery storage that is activated by the transactional memory support circuitry at a transaction start point to store a restore pointer identifying a chosen location within the prediction storage. Further, between the transaction start point and the transaction end point, the recovery storage is arranged to receive any item of prediction information that is removed from the prediction storage that was present in the prediction storage at the transaction start point. Then, the transaction memory support circuitry is responsive to the transaction being aborted, to reference the restore pointer held within the recovery storage in order to use that information to discard from the prediction storage any items of prediction information added to the prediction storage after the transaction start point. Further, any items of prediction information stored in the recovery storage are then stored back into the prediction storage. Such an approach enables the contents of the prediction storage to at least partially be recovered following a transaction abort (the amount of information recoverable being dependent on the size of the recovery storage), and avoids the area, performance, and power consumption impact of having to make a complete copy of the prediction storage contents at the start of a transaction. It has been found that such an approach can significantly improve prediction accuracy when re-executing transactions that have aborted.

In one example implementation, the prediction storage has a capacity sufficient to store up to N items of prediction information, and the recovery storage has a capacity sufficient only to store M items of prediction information, where M is less than N. Hence, in such an implementation, the recovery storage occupies less area than the prediction storage. However, it has been found that in many situations this still enables the prediction storage contents to be recreated to a sufficient extent following a transaction abort that accurate predictions can continue to be made when the transaction is retried.

In one particular implementation, the recovery storage is arranged to store up to M items of prediction information that were present in the prediction storage at the transaction start time. Then, when more than M items of prediction information that were present in the prediction storage at the transaction start point are removed from the prediction storage during execution of the transaction, the recovery storage may be arranged to retain the M removed items of prediction information that were most recently added to the prediction storage before the transaction start point. Hence, in such an implementation, when more than M items of prediction information are removed from the prediction storage during the transaction, that all relate to items of prediction information that were present at the transaction start time, then the older items of prediction information will be discarded (i.e. those added to the prediction storage longer before the transaction start point), and the most recent M items of prediction information (i.e. those added to the prediction storage most recently before the transactions start point) will be retained.

In one such implementation, when more than M items of prediction information are received from the prediction storage during execution of the transaction, the recovery storage is arranged to maintain an indication of the number of items of prediction information discarded by the recovery storage. In particular, in some implementations this information can be used to control how the prediction circuitry is used following the restoring of the prediction storage using the recovery storage information, for example by enabling certain prediction resources to at least initially be ignored by the prediction circuitry when starting to make predictions after the prediction storage has been updated using the recovery storage contents. However, in other implementations such information may not be useful, and hence in those implementations the recovery storage can be arranged not to keep any track of the number of items of prediction information discarded.

The restore pointer stored at the transaction start point can take a variety of forms, but in one example is arranged to identify as the chosen location that location which, at the transaction start point, stores the item of prediction information most recently stored into the prediction storage. By knowing which location stores the item of prediction information most recently stored into the prediction storage at the transaction start point, this enables a determination to be made as to any items of prediction information that should be discarded from the prediction storage following a transaction abort, in particular enabling identification of any items of prediction information that have been added during the performance of the transaction. It can also assist in identifying the entries within the prediction storage that the various items of prediction information held within the recovery storage should be restored to. In some implementations, one or more further pointers may also be used to assist in this latter process, to enable an identification of where each recoverable item of prediction information held within the recovery storage should be restored to within the prediction storage.

Based on the above discussion, it will be appreciated that the contents of the recovery storage are used to recover items of prediction information that are removed from the prediction storage during performance of a transaction, but that were present within the prediction storage at the start of the transaction. In order to implement the recovery process, there is no need to retain within the recovery storage any prediction information that is removed from the prediction storage, but that was not in the prediction storage at the transaction start point.

Hence, in one example implementation, if all of the items of prediction information present in the prediction storage at the transaction start point are removed from the prediction storage during execution of the transaction, the recovery storage is arranged not to store any subsequently removed items of prediction information. In particular, in such a scenario, any subsequently removed items of prediction information will relate to items that have been added into the prediction storage after the transaction start point, and hence do not need to be recovered.

The items of prediction information stored within the prediction storage can take a variety of forms. In one example arrangement, the prediction storage is arranged to store, as the items of prediction information, history information indicative of instruction flow for a number of previously encountered instruction flow changing instructions. The prediction circuitry may then be arranged to generate direction predictions for the instruction flow changing instructions, during which an entry in each of a plurality of direction predicting resources are identified using an associated group of items of prediction information maintained within the prediction storage.

The history information can take a variety of forms, dependent on the form of the prediction storage. For example, the prediction storage may take the form of a global history storage, where each item of history information identifies a taken or not taken prediction for a previously encountered instruction flow changing instruction. As another example, the prediction storage may provide a path history, where each item of history information comprises a number of bits of information associated with a previous instruction flow changing instruction that was predicted as taken. The bits of information forming each item of history information can be created in a variety of ways, for example by performing a hash function using a certain number of bits of the program counter value of the instruction flow changing instruction and a certain number of bits of the program counter value for the predicted target address of the instruction flow changing instruction.

Similarly, the prediction circuitry that uses such history information, and the direction prediction resources referenced by the prediction circuitry, can take a variety of forms. For example, the prediction circuitry may operate as a TAGE (TAgged GEometric length) predictor, the plurality of direction predicting resources may be a plurality of direction predicting tables, and each direction predicting table may be associated with a different group of items of prediction information maintained within the prediction storage. Hence, in such embodiments, each direction predicting table may be associated with a different length of history within the prediction storage.

However, in an alternative arrangement the prediction circuitry may operate as a perceptron predictor, the plurality of direction predicting resources may be a plurality of weight tables, and the entry identified in each weight table may be identified using the same group of items of prediction information maintained within the prediction storage. Hence, in such an implementation a certain number of items of prediction information are used to identify an entry within each of the weight tables, for example by performing a hash function using those items of prediction information and the program counter of the current instruction flow changing instruction for which a prediction is to be made, and then each weight obtained is associated with one bit of information stored in the prediction storage. In particular, each bit of information can be used to determine a +1/−1 factor which is multiplied by the associated weight. Then the results are summed in order to produce an output which is either positive or negative, with the prediction as to whether the instruction flow changing instruction is taken or not taken being dependent upon whether the outcome of that summation is positive or negative.

The instruction flow changing instructions can take a variety of forms, but in one implementation are branch instructions, and the history information is updated in dependence on the direction predictions made by the prediction circuitry for the branch instructions. Hence, for the earlier described global history arrangement, the history information may be updated each time a direction prediction is made for a branch instruction, to identify whether the prediction is that the branch instruction will be taken or not taken. Similarly, for the earlier discussed path history example, the history information may be updated each time a branch instruction is predicted as taken.

The prediction storage can be organised in a variety of ways, but in one example the prediction storage is arranged to operate as a shift register to store N items of prediction information, and when a new item of prediction information is added to the prediction storage in a condition where the prediction storage is full, the oldest item of prediction information is evicted from the prediction storage. The recovery storage may be arranged during execution of the transaction to receive each item of prediction information evicted from the prediction storage, when that item of prediction information was present in the prediction storage at the transaction start point.

Whilst the prediction storage may be physically implemented as a shift register, in some implementations it may be implemented in an alternative manner, but still arranged to operate as a shift register. For example, it may be arranged as a circular buffer with pointers used to ensure that it operates as a shift register. This can be a more cost effective implementation than providing the prediction storage directly as a shift register, particularly when the number of items of prediction information held within the prediction storage is relatively large.

In one such implementation, the recovery storage may be arranged to operate as a shift register to store up to M items of prediction information evicted by the prediction storage during execution of the transaction, where M is less than N. When the number of items of prediction information evicted by the prediction storage during execution of the transaction exceeds M, the recovery storage may then be arranged to discard older evicted items of prediction information such that the recovery storage stores the most recently evicted M items of prediction information that were present in the prediction storage at the transaction start time.

Hence, when the recovery storage becomes full, it will be seen that the recovery storage contents are shifted in synchronisation with the shifted contents of the prediction storage, with the oldest items of prediction information being discarded from the recovery storage. This means that at the time of recovery, at least the most recent M items of prediction information that were present in the prediction storage at the transaction start time are still available to be restored back to the prediction storage. In particular the prediction storage can be restored to contain the M items of prediction information retrieved from the recovery storage, plus any items of prediction information that were present in the prediction storage at the transaction start time and that were still in the prediction storage at the recovery time.

In one example implementation, the recovery storage is arranged to maintain an indication of the number of items of prediction information discarded by the recovery storage. The transactional memory support circuitry is then responsive to abortion of the transaction causing the storing back into the prediction storage of any items of prediction information stored in the recovery storage, to use the indication of the number of items of prediction information discarded by the recovery storage to determine which of the plurality of direction predicting resources are initially ignored by the prediction circuitry when the prediction circuitry resumes making direction predictions using the prediction storage.

Hence, considering the earlier-mentioned TAGE predictor example, this may mean that one or more of the direction prediction tables that use a larger number of items of prediction information may initially be ignored by the prediction circuitry when the prediction circuitry is re-enabled after the prediction storage is recovered, since not all of the items of prediction information used to index into that direction prediction table may be available.

For the earlier-mentioned perceptron predictor example, then provided the items of prediction information required to form the group that is used to index into all of the weight tables is available, then all of the direction predicting resources can be accessed, but it may be that one or more of the weights available from those direction predicting resources is not used, if the corresponding item of prediction information that uses that weight is not available. Again, the indication of the number of items of prediction information discarded by the recovery storage can be used to determine which direction predicting resources are initially ignored, if any. If following the restoring of the prediction storage any item of prediction information within the group that is used to access each weight table is not available, then in one implementation the perceptron predictor can initially be disabled, with prediction being re-enabled once a sufficient amount of prediction information is present within the prediction storage to allow the weight tables to be indexed.

Hence, in one example implementation, the prediction circuitry is arranged to initially ignore any direction predicting resource whose associated group of items of prediction information is incomplete following the restoring of the prediction storage using the items of prediction information stored in the recovery storage.

Furthermore, in one example implementation the indication of the number of items of prediction information discarded by the recovery storage is used to initiate a counter that is adjusted each time the prediction circuitry adds a new item of prediction information to the prediction storage, and is used by the prediction circuitry to determine when each initially ignored direction predicting resource is reutilised by the prediction circuitry.

Whilst in the above described examples the prediction information stored within the prediction storage is history information, and the prediction circuitry is used to generate direction predictions for instruction flow changing instructions, the techniques described herein can also be used in other forms of prediction circuits. For example, in one implementation the prediction storage may be arranged to store, as the items of prediction information, predicted target addresses for return instructions. In such an implementation, the prediction circuitry may be target address prediction circuitry used to generate, as the predictions, predicted target addresses for return instructions.

In such an implementation the prediction storage can take a variety of forms. In one particular example implementation, each return instruction is provided in association with an earlier call instruction, the prediction storage is arranged as a return stack, and in association with each encountered call instruction a return address for the call instruction is determined and pushed onto the return stack to form the predicted target address for the associated return instruction. The processing circuitry is responsive to completing execution of a return instruction to pop a return address from the return stack.

Hence, it will be seen that once the processing circuitry has completed execution of a return instruction within a transaction, and hence that return instruction has been committed in order to enable forward progress with regard to execution of subsequent instructions within the transaction, the return address will be popped from the return stack. As a result, if the transaction fails, this can lead to a loss of information from the return stack which can in due course, when the transaction is retried, lead to mispredictions being made when seeking to predict target addresses for return instructions. This can be particularly problematic in situations where the associated call instruction for at least one return instruction within the transaction is itself outside of the transaction, since when the transaction is retried, that call instruction will not be re-executed, and accordingly the return address will not be recomputed and added to the return stack. It such situations, this could lead to a misprediction being made for every return instruction within the transaction, significantly impacting performance.

However, in accordance with the techniques described herein, the recovery storage can be used to enable recovery of such popped return addresses from the return stack. In particular, in one example implementation, the recovery storage is arranged to store as the restore pointer a pointer identifying a location in the return stack storing the most recently added return address, and is arranged to mark every location storing a valid return address at the transaction start point as being a recoverable location. Each time during execution of the transaction a return address is popped from a recoverable location in the return stack, the recovery storage is then arranged to receive that return address.

Hence, by identifying the location in the return stack that stores the most recently added return address at the transaction start point, and at that time marking every location that is holding a valid return address as being a recoverable location, popped return addresses relating to recoverable locations can be stored within the recovery storage, allowing their later recovery into the prediction storage following a transaction abort.

As with the earlier discussed examples, the recovery storage can be arranged to have capacity to store M return addresses, where M is less than the total number of return addresses that may be stored within the prediction storage. In such implementations, when during execution of the transaction more than M return addresses are popped from recoverable locations in the return stack, the recovery storage may be arranged to retain the least recently popped M return addresses. In particular, due to the way in which the return stack operates, it is those least recently popped M return addresses that were most recently added to the return stack before the transaction start point.

When, following an abort of the transaction, the content of the return stack is restored using the content stored in the recovery storage, the return addresses will in one implementation be stored at contiguous locations in the return stack. If any return addresses were discarded by the recovery storage during the transaction, they will relate to older return addresses (i.e. return addresses added into the return stack a longer time before the transaction start point) than those retained by the recovery storage and then restored into the return stack. This means that whilst in the initial phase of re-executing the transaction, accurate predictions of return addresses will be made using the information restored into the return stack from the recovery storage, at some point the prediction circuitry will start to make mispredictions due to the lost information that was not restored.

If desired, the recovery storage may be arranged to maintain an indication of the number of items of prediction information discarded by the recovery storage. In such an implementation, the prediction circuitry may be arranged, following recovery of the prediction storage using the recovery storage in response to the transaction being aborted, and when execution of the transaction is retried, to use said indication to determine a point at which to disable prediction of target addresses for return instructions using the return addresses held in the return stack. Hence, based on information about which return addresses have been discarded, the prediction circuitry can be arranged to decide when it is appropriate to stop making predictions of return addresses during re-performance of the transaction. However, a benefit is still obtained from using the recovery storage since accurate predictions can still be made during the first part of the transaction when it is re-executed, using the return addresses that were restored into the return stack from the recovery storage.

Particular examples will now be described with reference to the Figures.

FIG. 1 illustrates an example of a data processing apparatus 2 with hardware transactional memory (HTM) support. The apparatus has processing logic 4 for executing instructions to carry out data processing operations. For example the processing logic 4 may include execution units for executing various types of processing operations, such as an arithmetic/logic unit (ALU) for carrying out arithmetic or logical operations such as add, multiply, AND, OR, etc.; a floating-point unit for performing operations on floating point operands; or a vector processing unit for carrying out vector processing on vector operands comprising multiple data elements. A set of architectural registers 6 is provided for storing operands for the instructions executed by the processing logic 4 and for storing the results of the executed instructions. An instruction decoder 8 decodes instructions fetched from an instruction cache 10 by fetch circuitry 11 to generate control signals for controlling the processing logic 4 or other elements of the data processing apparatus 2 to perform the relevant operations. A load/store unit 12 is also provided to perform load operations (in response to load instructions decoded by the instruction decoder 8) to load a data value from a data cache 14 or lower levels of cache/main memory 16 into the architectural registers 6, and store operations (in response to store instructions decoded by the instruction decoder 8) to store a data value from the architectural registers 6 to the data cache 14 or lower levels of cache/main memory 16.

The apparatus 2 also has transactional memory support circuitry 20 which provides various resources for supporting hardware transactional memory (HTM). The HTM resources in the transactional memory support circuitry 20 may include for example speculative result storage 22 for storing speculative results of transactions, address tracking circuitry 24 for tracking the addresses accessed by a transaction, conflict detection circuitry 26 for detecting conflicts between data accesses made by a transaction and data accesses made by other threads, so that a transaction can be aborted when a conflict is detected, and restoration state storage circuitry 28 for storing a snapshot of the architectural state data from the architectural registers 6 at the start of a transaction, so that this state can be restored to overwrite the speculative results of the transaction when a transaction is aborted.

To assist the fetch circuitry 11 in determining which instructions to fetch for decoding by the instruction decoder 8, prediction circuitry 30 may be used. In particular, the prediction circuitry can be used to make certain predictions with regard to instruction flow changing instructions within the sequence of instructions being executed by the processing circuitry 4. Instruction flow changing instructions are instructions which can cause a discontinuous change in the instruction address, so that the next instruction executed after the instruction flow changing instruction may not be the sequentially following instruction in the instruction address space.

There are various types of instruction flow changing instruction that may be executed, but one type of instruction flow changing instruction is a branch instruction. Typically a branch instruction may be conditional, so that the branch instruction may be taken or not taken depending on evaluation of certain condition flags at the time the branch instruction is executed. If the branch is taken, then instruction flow changes to a computed target address, whereas if the branch is not taken then typically the instruction immediately following the branch instruction in the instruction address space is instead executed. The prediction circuitry can for example be direction prediction circuitry used to predict whether such a branch instruction is taken or not taken. In addition, or alternatively, the prediction circuitry may be used to predict the target address for instruction flow changing instructions. Hence, if it is determined, or predicted, that the instruction flow change in instruction will cause a change in instruction flow, then the predicted target address can be used by the fetch circuitry 11 to fetch the next instruction that is predicted will need to be executed following the instruction flow changing instruction.

The prediction circuitry 30 has access to prediction storage 35 which stores a plurality of items of prediction information that are referenced by the prediction circuitry when generating the predictions used by the fetch circuitry 11. Typically, the contents of the prediction storage (along with the contents of direction predicting resources such as the TAGE tables and weight tables referred to later) will be updated during operation of the apparatus 2, and in particular the items of prediction information maintained within the prediction storage may change based on the instructions being executed by the apparatus.

The prediction storage 35 can take a variety of forms, dependent on the type of functionality implemented by the prediction circuitry 30. For example, when the prediction circuitry is used to predict branch direction, and hence whether a branch instruction is predicted as taken or not taken, the prediction storage may take the form of a history register, that is used to maintain a pattern of information indicative of branch behaviour of previously encountered branch instructions. The history register can maintain a variety of different types of information. For example, a history register may implement a global history, where the items of prediction information maintained indicate the taken or not taken predictions made for a series of previously encountered branch instructions. Alternatively, the history register may maintain path history information, where each item of prediction information is typically a multi-bit value. For example, the path history may maintain an item of prediction information for each branch instruction that is predicted as taken. For instance, for each branch instruction predicted as taken, a certain number of bits of the program counter of the branch instruction may be hashed with a certain number of bits of the predicted target address of the branch instruction in order to produce a multi-bit value stored as the item of prediction information.

As will be discussed in more detail later herein, the contents within the prediction storage can be used by the prediction circuitry when accessing direction predicting resources, in order to produce a direction prediction for a currently encountered branch instruction.

However, there is no requirement for the prediction storage 35 to form a history register. For example, the prediction circuitry 30 may be used to predict target addresses for return instructions, and in such instances the prediction storage may take the form of a return stack used to store predicted target addresses for return instructions. For instance, each return instruction may be provided in association with an earlier call instruction, and in association with each encountered call instruction a return address for the call instruction may be determined and pushed on to the return stack to form a predicted target address for the associated return instruction. That information can be retrieved by the prediction circuitry 30 when making target address predictions for return instructions encountered within the instruction stream.

As discussed earlier, the amount of information maintained within the prediction storage can be relatively large, and accordingly there could be both an area and a performance cost associated with taking a complete snapshot of the contents of the prediction storage at the time a transaction starts, in order to capture that information as part of the restoration state 28 held by the HTM resources 20. However, as mentioned earlier the contents of the prediction storage will change as instructions are executed, and accordingly if a transaction fails and thus the instructions within the transaction need to be retried, if it is not possible to restore the contents of the prediction storage at that point this can significantly reduce prediction accuracy when seeking to make predictions using the prediction circuitry the next time the transaction is attempted. As will be discussed in more detail herein, this problem is alleviated through the use of recovery storage 40, which is used in combination with an iterative mechanism described herein to allow information evicted from the prediction storage during the performance of a transaction, that was present in the prediction storage before the transaction started, to be progressively captured within the recovery storage, thereby enabling that information to be restored back to the prediction storage upon the occurrence of a transaction abort.

Figure 2:
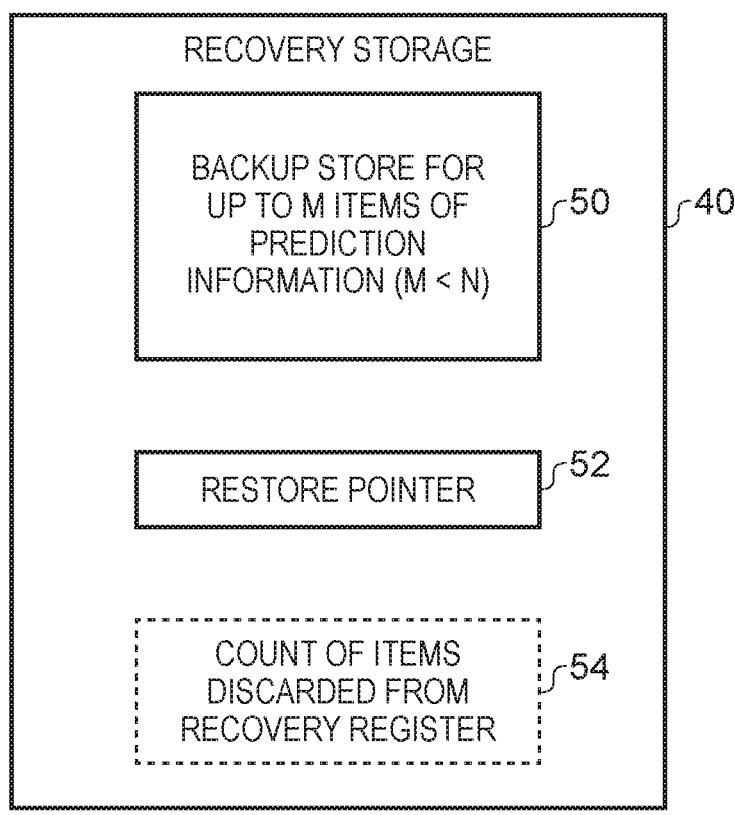
FIG. 2 schematically illustrates information that may be held within the recovery storage of FIG. 1 in accordance with one example arrangement.

FIG. 2 schematically illustrates information that can be maintained within the recovery storage 40. As shown, a backup store 50 can be provided within the recovery storage, comprising a plurality of entries for storing items of prediction information evicted from the prediction storage. In the implementations described herein, the backup store is smaller than the prediction storage itself. In particular, whilst the prediction storage 35 may be able to store up to N items of prediction information, the backup store is arranged to only be able to store up to M items of prediction information, where M is less than N. The exact size of the backup store can be varied dependent on implementation, but in practice it has been found that in many implementations reliable recovery of sufficient information into the prediction storage is possible to allow accurate predictions to continue to be made by the prediction circuitry upon retrying a transaction, without needing to provide within the recovery storage 40 sufficient space to store every entry within the prediction storage.

As also shown in FIG. 2, the recovery storage has a storage element 52 for storing a restore pointer. In one implementation, at the transaction start point the restore pointer storage element 52 is populated with a pointer identifying the location within the prediction storage storing the item of prediction information most recently stored into the prediction storage, i.e. the most recently added item of prediction information prior to the transaction starting. As will be discussed in more detail later, in the event of a transaction abort, the restore pointer can then be used to determine which items of prediction information to discard from the prediction storage, in particular at that point it being decided to discard any items added into the prediction storage since the start of the transaction. Further, it can assist in determining which locations within the prediction storage the various items of prediction information now held within the recovery storage are stored back into. In some implementations, one or more additional pointers can also be used to assist in this process, but the aim is that any item of information held in the recovery storage 40 at the time of the transaction abort will be stored back to the appropriate location within the prediction storage 35 following the transaction abort. If all of the prediction information evicted from the prediction storage during processing of the transaction, that was held within the prediction storage prior to the start of the transaction, is held within the recovery storage 40, then the prediction storage can be restored directly to the form it had prior to the transaction starting. In situations where more items of prediction information (that were in the prediction storage at the transaction start point) have been evicted from the prediction storage than can be stored within the recovery storage, then one or more of those items of information will have been lost, but as will be apparent from the following discussions the prediction storage can still be recreated to an extent that allows reliable predictions to be made once the prediction circuitry is re-enabled after the prediction storage is restored.

In some implementations, a count of the number of items of prediction information discarded from the recovery storage 40 can be maintained as a counter 54 within the recovery storage 40. In particular, for the history register examples discussed herein, that information can be used to control how one or more direction predicting resources are used following re-enablement of the prediction circuitry after the prediction storage has been restored, and in particular one or more direction prediction resources may be ignored for at least an initial period of time after the prediction circuitry is re-enabled. In other implementations, there may be no need for such a counter 54, as for instance is the case for the return stack example discussed later herein.

Figure 3:
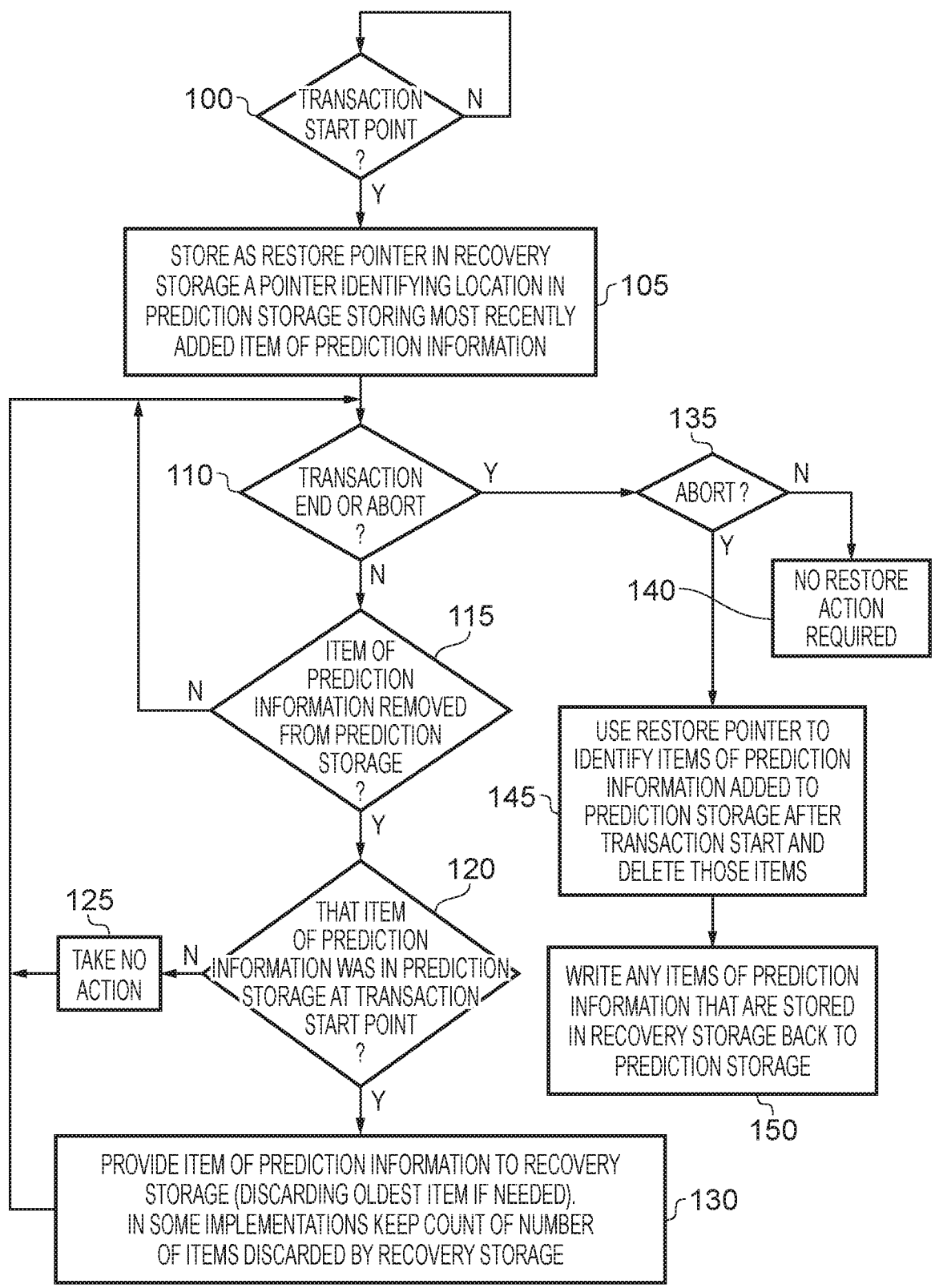
FIG. 3 is a flow diagram illustrating use of the recovery storage during a transaction, in accordance with one example arrangement.

FIG. 3 is a flow diagram illustrating how the recovery storage 40 is used in one example implementation. At step 100, it is determined whether a transaction start point has been reached, and when that is the case the process proceeds to step 105 where a pointer identifying the location within the prediction storage 35 storing the most recently added item of prediction information is stored as a restore pointer within the storage element 52 of recovery storage 40.

The process then proceeds to step 110 where it is determined whether the transaction has ended or has been aborted. If not, then it is determined whether an item of prediction information has been removed from the prediction storage 35. As discussed earlier, this can occur as part of the normal operation of the prediction storage. In particular, as new items of prediction information are added into the prediction storage, one or more older items may be evicted. As another example, considering the return stack implementation, as return instructions are committed by the processing circuitry 4, then the corresponding return addresses can be popped from the return stack forming the prediction storage 35.

When at step 115 it is determined that an item of prediction information has been removed, then at step 120 it is determined whether that item of prediction information was in the prediction storage at the transaction start point. This can be determined in a variety of ways, for instance with reference to the restore pointer 52 for some forms of prediction storage (for example when the prediction storage operates as a shift register), or with reference to some supplemental information such as a recoverable field flag as will be discussed later with reference to the return stack example.

If the item that has been removed from the prediction storage does not correspond to prediction information that was in the prediction storage at the transaction start point, then as indicated by step 125 no further action is required, and the process can return to step 110. However, if the item of prediction information was in the prediction storage at the transaction start point, then the process proceeds to step 130, where that item of prediction information is provided to the recovery storage. This may result in the discarding of the oldest item of prediction information if necessary (the oldest item being the item added to the prediction storage the longest before the transaction start point), so that the recovery storage retains the newest items of prediction information (i.e. those items added to the prediction storage most recently before the transaction start point). As mentioned earlier, in some implementations a count may be kept of the number of items discarded by the recovery storage. The process then returns to step 110.

When at step 110 it is determined that the transaction has ended or aborted, the process proceeds to step 135 where it is determined whether the transaction has aborted. If it has not, then this means that the transaction has ended correctly, and accordingly the process proceeds to step 140 where no restore action is required. At this point the contents of the recovery storage 40 can be cleared, as they are no longer required. The recovery storage can then be re-enabled next time a transaction start point is encountered.

Assuming at step 135 it is determined that the transaction has aborted, then the process proceeds to step 145 where the restore pointer stored within the storage element 52 of the recovery storage 40 is used to identify the items of prediction information that have been added to the prediction storage after the transactions start point, and those items are then deleted from the prediction storage. In addition, at step 150, any items of prediction information that are stored in the recovery storage are written back into the prediction storage. One or more additional pointers, in addition to the restore pointer, may be used to identify which location within the prediction storage each item of prediction information maintained within the recovery storage 40 is to be written to.

Figure 4A:
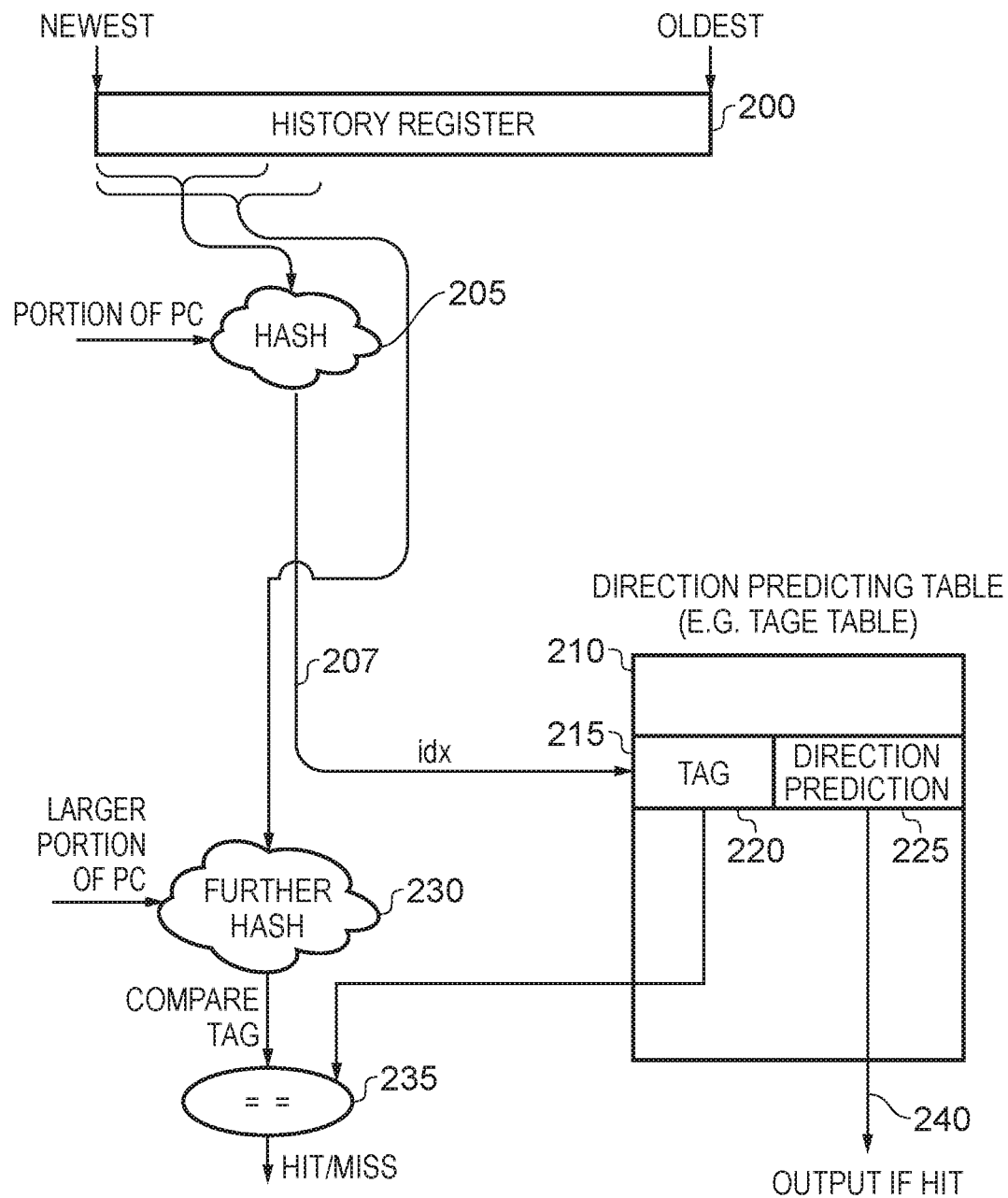
FIGS. 4A and 4B illustrates one example implementation where the prediction storage takes the form of a history register, and the prediction circuitry takes the form of a TAGE predictor.
Figure 4B:
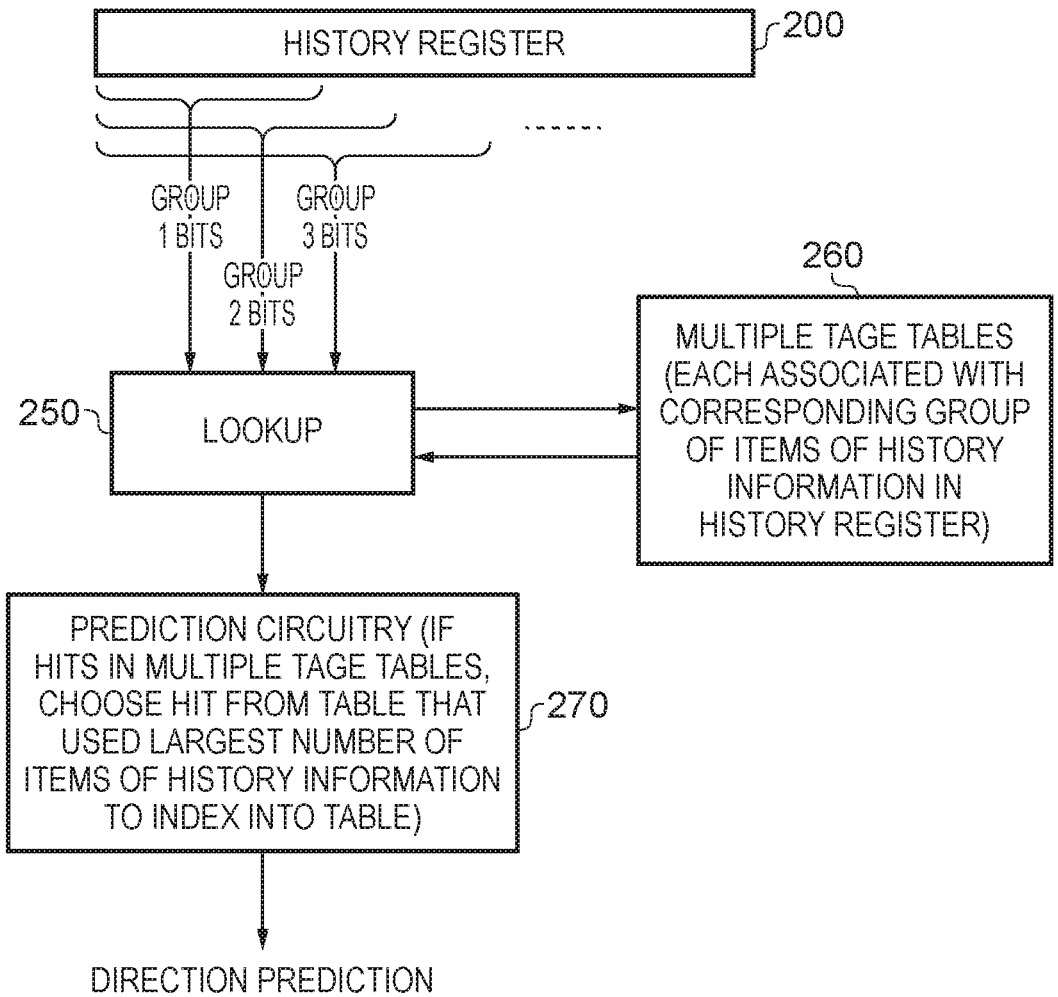

FIGS. 4A and 4B illustrate one use case scenario, where the prediction storage 35 takes the form of a history register, which in one example implementation is organised as a shift register, and further indicates how the history register is used by the prediction circuitry to make direction predictions. In the particular example shown in FIGS. 4A and 4B, the prediction circuitry takes the form of a TAgged GEometric length predictor (TAGE predictor) which makes use of a number of direction predicting tables, also referred to as TAGE tables. Each TAGE table may be associated with a different length of history maintained within the history register.

As shown in FIG. 4A, a history register 200 is maintained, providing a plurality of items of prediction information (also referred to herein as history information) extending from a newest added item through to an oldest added item. In one implementation the history register is arranged to operate as a shift register, and as each new item of history information is shifted in from the left hand side, the oldest item of history information is evicted from the right hand side. In one implementation, each new item is added into the history register dependent on a prediction made by the prediction circuitry for a current branch instruction. Provided the history register is not full, or in the event that the history register is full then provided that the instruction associated with the oldest item of history information has been committed by the processing circuitry, the prediction circuitry 30 can make a direction prediction using the contents of the history register, and then may populate the newest item of history information dependent on that prediction. In an example where the history register is a global history, then a new item will be added to identify whether the latest branch instruction has been predicted as taken or not taken. In the example of a path history being maintained within the history register, then in the event that the prediction circuitry predicts the latest branch instruction as being taken, then a new item of history information will be added to the history register.

Independent of the format of the history information maintained within the history register 200, then FIGS. 4A and 4B schematically illustrate how those contents are used in order to make a branch direction prediction. Firstly, a certain number of items of history information, starting from the newest item, are provided to a hash function 205, along with a portion of the program counter of the current branch instruction for which a prediction is to be made, and the hash function uses this information in order to generate an index output over path 207 to identify an entry 215 within a corresponding TAGE table 210. That entry 215 will include a tag portion 220 and a direction prediction indication 225. The tag portion is routed to a comparison block 235, which also receives a compare tag that is generated by a further hash function 230 using a certain number of items of history information from the history register, and a portion of the program counter of the current branch instruction for which a prediction is required. In the example illustrated in FIG. 4A a larger portion of the history register (i.e. containing a larger number of items of history information from the history register) is routed to the further hash function 230 than is routed to the hash function 205, and a larger portion of the program counter value is used by the further hash function than the portion of the program counter that was used by the hash function 205. However, there is no need for the portion of the program counter or the portion of the history register used by the further hash function 230 to be larger than the respective portions used by the hash function 205, and in alternative implementations the same portion, or a smaller portion, may be used.

The further hash function 230 then produces a compare tag which is compared by the comparison circuitry 235 with the tag 220 to determine whether there is a hit or a miss. In the event of a hit, the direction prediction 225 is output from the TAGE table 210 for use by the prediction circuitry 30.

Whilst the history register 200 is arranged in one implementation to operate as a shift register, it may or may not be physically constructed as a shift register. Often the history register will be relatively large, and it can be more efficient to implement the shift register functionality using other mechanisms, for example by using a circular buffer with pointers used to ensure that the circular buffer operates like a shift register.

As schematically illustrated in FIG. 4B, there will typically be multiple TAGE tables 260, each of which are associated with a corresponding groups of item of history information in the history register, where those groups include progressively larger amounts of the history information within the history register.

The lookup procedure 250 corresponds to the process discussed with reference to FIG. 4A but will be applied multiple times, once for each of the different TAGE tables, and each time using the appropriate group of bits from the history register 200. As indicated by the box 270, the prediction circuitry then uses the result of those various lookup procedures in order to determine whether the currently considered branch instruction is to be predicted as taken or not taken. In the event that there are hits from multiple TAGE tables, then the hit from the TAGE table that uses the largest number of items of history information to index into that TAGE table will be used by the prediction circuitry, since it is generally considered that the prediction will be more accurate from such a TAGE table. Hence, the prediction circuitry chooses the hit from the TAGE table that used the largest number of items of history information, and in particular uses the direction prediction information output by that TAGE table in order to form the taken/not taken prediction for the current branch instruction.

When adopting the approach of FIGS. 4A and 4B, then the prediction storage takes the form of a history register, and the recovery storage can take the form of a transaction history register that is used to store evicted items of history information from the history register, when those items of history information were present within the history register prior to the transaction start time. This process is illustrated schematically in FIG. 5, where the history register is shown by the element 280, and the transaction history register (i.e. the backup store 50 within the recovery storage 40) is shown by the element 285. For simplicity, the history register 280 is assumed to store five items of history information, but in practice it will be appreciated that the history register may be much longer, and accordingly be able to store significantly more items of history information. Further, the transaction history register 285 is assumed to store only two items of history information, although again in practice it may be able to store more items of history information. Whatever the exact number of items storable in each storage structure 280, 285 is in any particular implementation, it is assumed herein that the number of items of history information that can be stored within the transaction history register 285 is less than number of items of history information that can be stored within the history register 280.

At the time transaction code is encountered, and accordingly the transaction start point has been reached, it is assumed that the history register 280 is full and stores items of history information for each of the instructions A to E. At the transaction start point, the history register read pointer is stored into the restore pointer storage 52 of the recovery storage 40, to identify the youngest entry (i.e. the entry storing the history information for the instruction E).

Within the transaction, it is then assumed that a branch not equal (BNE) instruction is encountered, and that a prediction is made for that instruction (the BNE instruction being viewed as instruction F in the figure). It is also assumed at this point that instruction A has been committed, and accordingly it is acceptable for the history information for instruction A to be evicted from the history register 280 to make way for the prediction made for instruction F (if instruction A had not been committed at that point, then no prediction would be made for the BNE instruction). Hence, a prediction is made for instruction F, and that prediction is pushed into the history register as shown, resulting in the history information for instruction A being evicted. However, in accordance with the technique discussed earlier, that history information is captured within the transaction history register 285.

Figure 5:
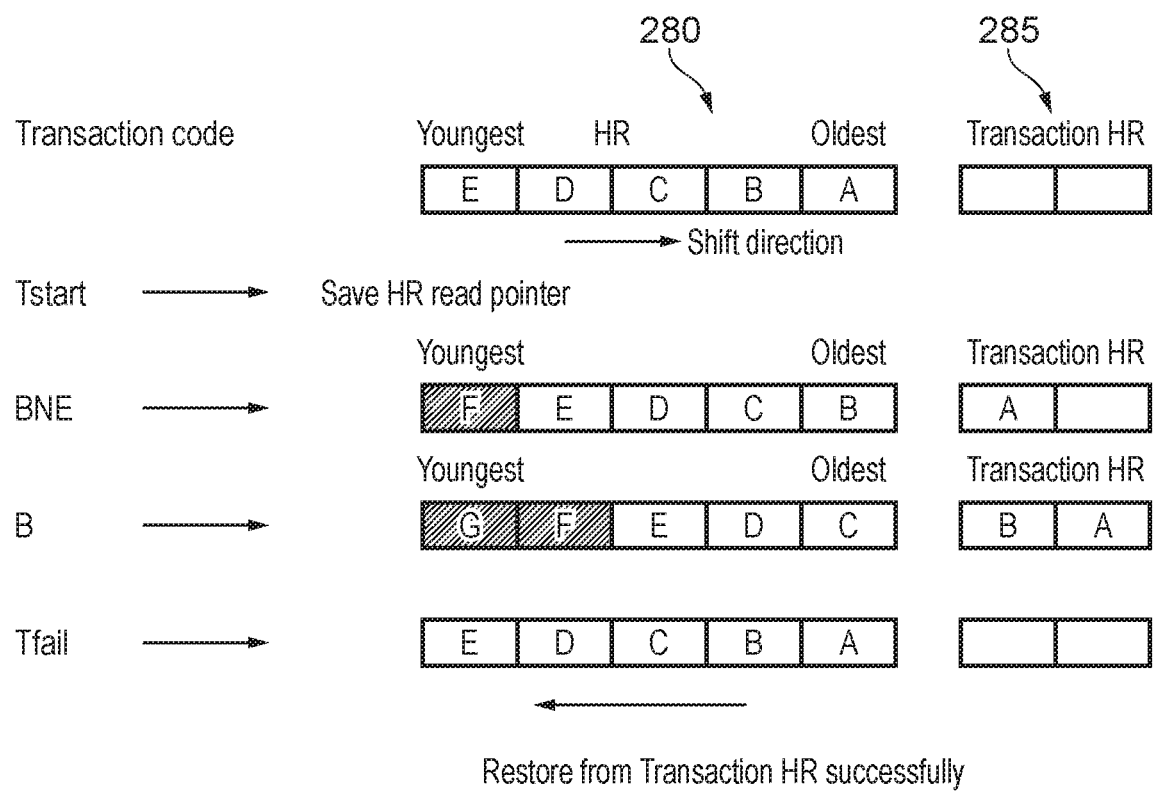
FIG. 5 schematically illustrates how the recovery storage may be used as a transaction history register in implementations where the prediction storage is a history register.

As further indicated in FIG. 5, a subsequent branch instruction is also encountered within the transaction (that branch instruction being referred to in the example as instruction G), and again a prediction is made for that branch instruction (since it is assumed at this time that instruction B has been committed by the processing circuitry, and accordingly the history information for instruction B can be evicted from the history register 280). Accordingly, the prediction is made and the prediction is pushed into the newest entry of the history register, resulting in the history information for instruction B being evicted and captured within the transaction history register 285.

During the above process, if the history register is physically arranged as a shift register the recovery pointer will typically need to be modified to ensure that it continues to point to the entry containing the youngest prediction storage entry at the transaction start point (i.e. the entry containing the history information for instruction E). However, if the history register is arranged as a circular buffer then an update to the recovery pointer will not typically be necessary.

As shown in FIG. 5, if a transaction fail condition is detected, i.e. the transaction has aborted, then the restore pointer that was captured at the transaction start time (T start) can be used to determine that the history information for instructions F and G should be discarded, and that the history register contents should be shifted left by two positions, whilst at the same time the recovery history information held within the transaction history register 285 is shifted back into the history register 280. Hence, as shown by the bottom entry in FIG. 5, it can be seen that the history register can be restored completely to the form that existed at the transaction start time. As a result, the prediction circuitry can continue to make reliable predictions once the transaction is re-attempted, since none of the history information has been lost. Further, in accordance with the technique described herein, there was no need to capture the entire content of the history register at the transaction start point, and hence the described technique gives rise to significant area and performance benefits.

Figure 6:
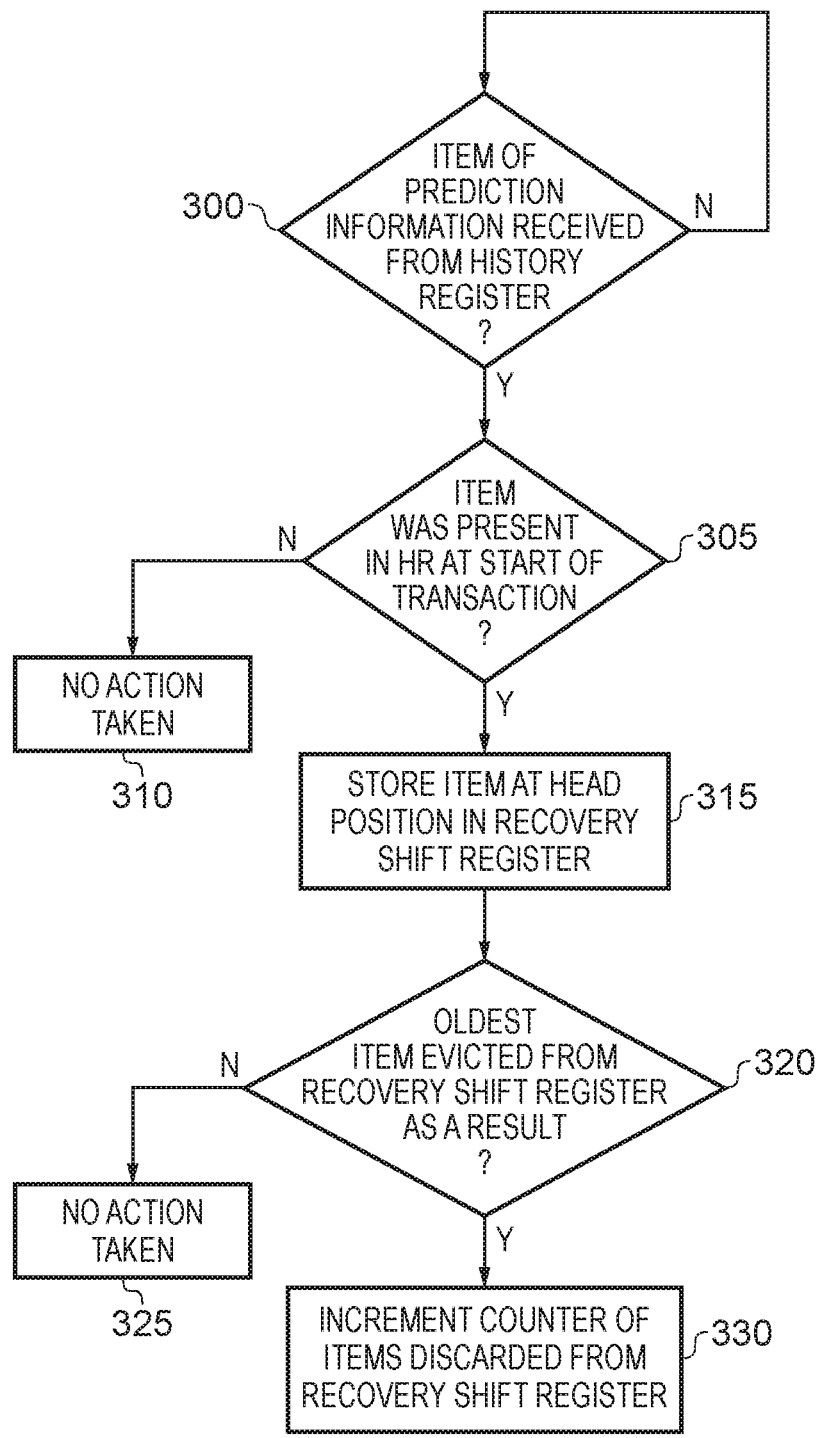
FIG. 6 is a flow diagram illustrating the operation of the transaction history register (also referred to herein as a recovery shift register) of FIG. 5 in accordance with one example implementation.

FIG. 6 is a flow diagram illustrating the operation of the recovery shift register, i.e. the transaction history register 285 shown in FIG. 5. At step 300, it is determined whether an item of prediction information is received from the history register 280. If so, then at step 305 it is determined whether the item was present in the history register at the start of the transaction. In one implementation, this can be determined with reference to the restore pointer, which as discussed earlier identifies the youngest entry in the history register at the transaction start time.

If the item was not present in the history register at the start of the transaction, then as indicated by step 310 no further action is taken, and in particular that item of history information is not stored within the transaction history register 285.

However, if the item was present in the history register at the start of the transaction, then that item of history information is stored at the head position in the recovery shift register at step 315. It is then determined at step 320 whether the oldest item stored within the transaction history register 285 has now been evicted. If not, as indicated by step 325 no further action is required. However, if the oldest item has been evicted, then a counter is incremented at step 330, hence keeping track of the number of items discarded from the recovery shift register.

Figure 7A:
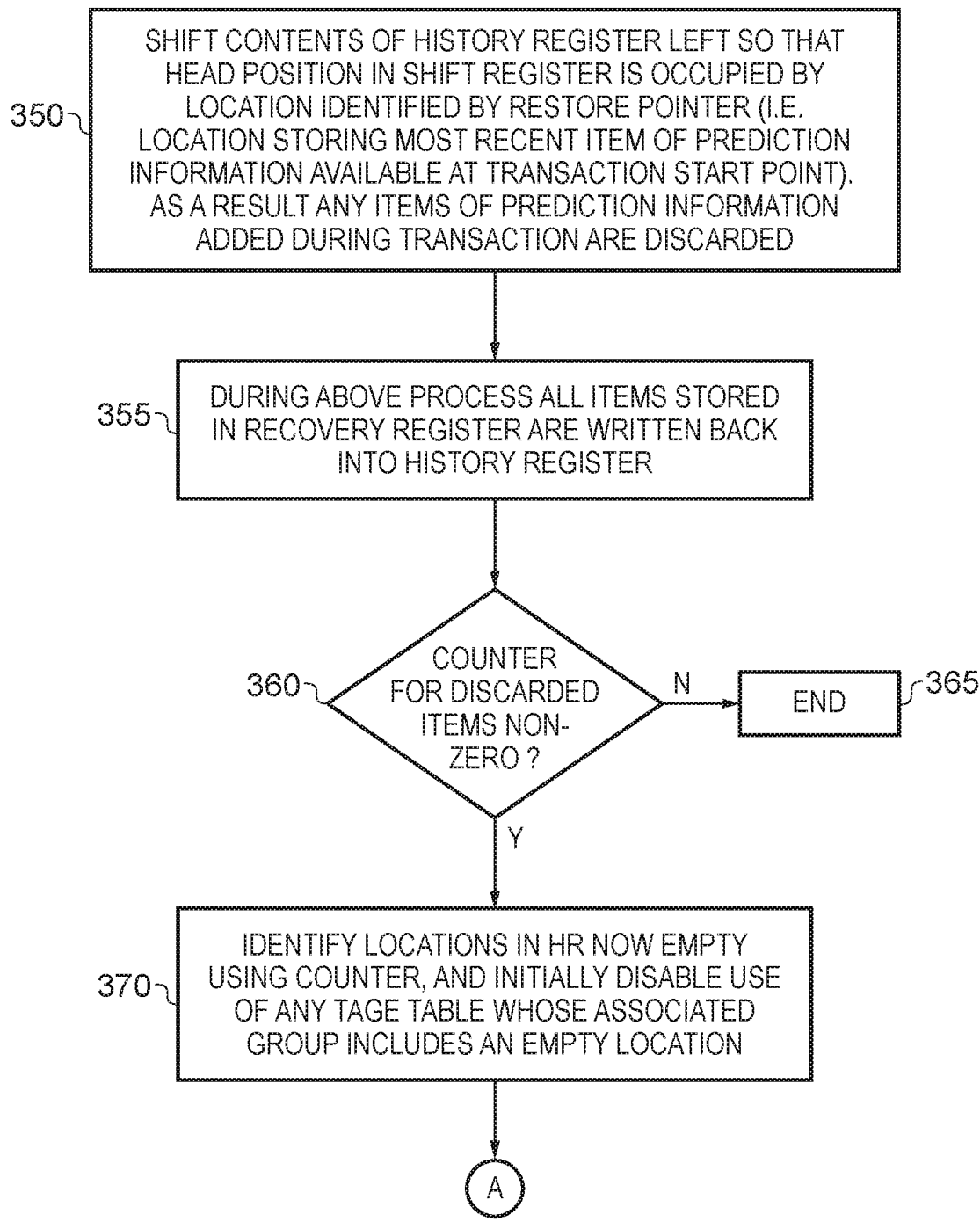
FIGS. 7A and 7B are flow diagrams illustrating steps performed upon a transaction fail, in order to use the contents of the recovery storage to repopulate the prediction storage.
Figure 7B:
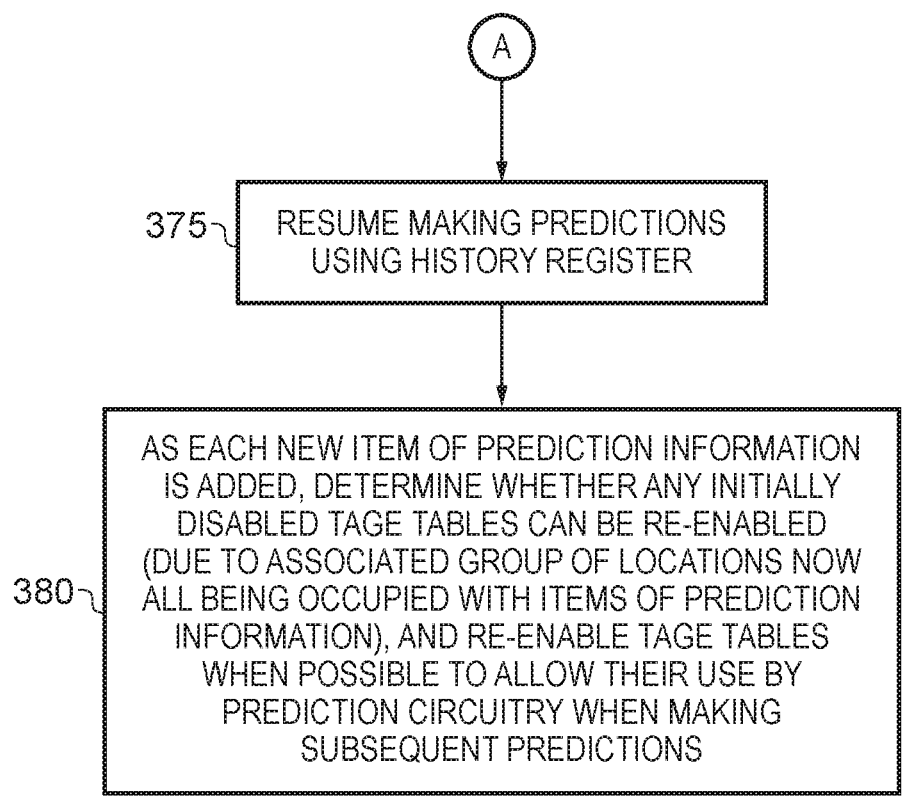

FIGS. 7A and 7B illustrate steps taken upon a transaction fail, i.e. when a transaction aborts. At step 350, the contents of the history register 280 are shifted left so that the head position in the shift register is occupied by the location identified by the restore pointer. Hence, the location storing the most recent item of prediction information available at the transaction start point is then restored back to the head position in the shift register. As a result, any items of prediction information added during the transaction are discarded. Hence, with reference to the earlier discussed FIG. 5, this process causes the items of history information for instructions F and G to be discarded.

During the above process, then as indicated by step 355 all of the items stored in the recovery register are written back into the history register. An extra pointer may be maintained, in addition to the restore pointer, to identify the location within the history register 280 into which each item of history information maintained within the transaction history register is to be stored.

At step 360, it is then determined whether the counter for the discarded items is non-zero. If the counter is zero, then no further action is required and the process ends at step 365. However, if the counter is non-zero, then the process proceeds to step 370 where the locations in the history register 280 that are now empty are identified using the counter, and then initially any TAGE table whose associated group of history register entries includes an empty location is disabled. Hence, with reference to FIG. 4A, if the number of items of history information required by either of the hash functions 205, 230 includes an entry in the history register that is now empty, then the corresponding TAGE table is initially disabled.

Figure 8:
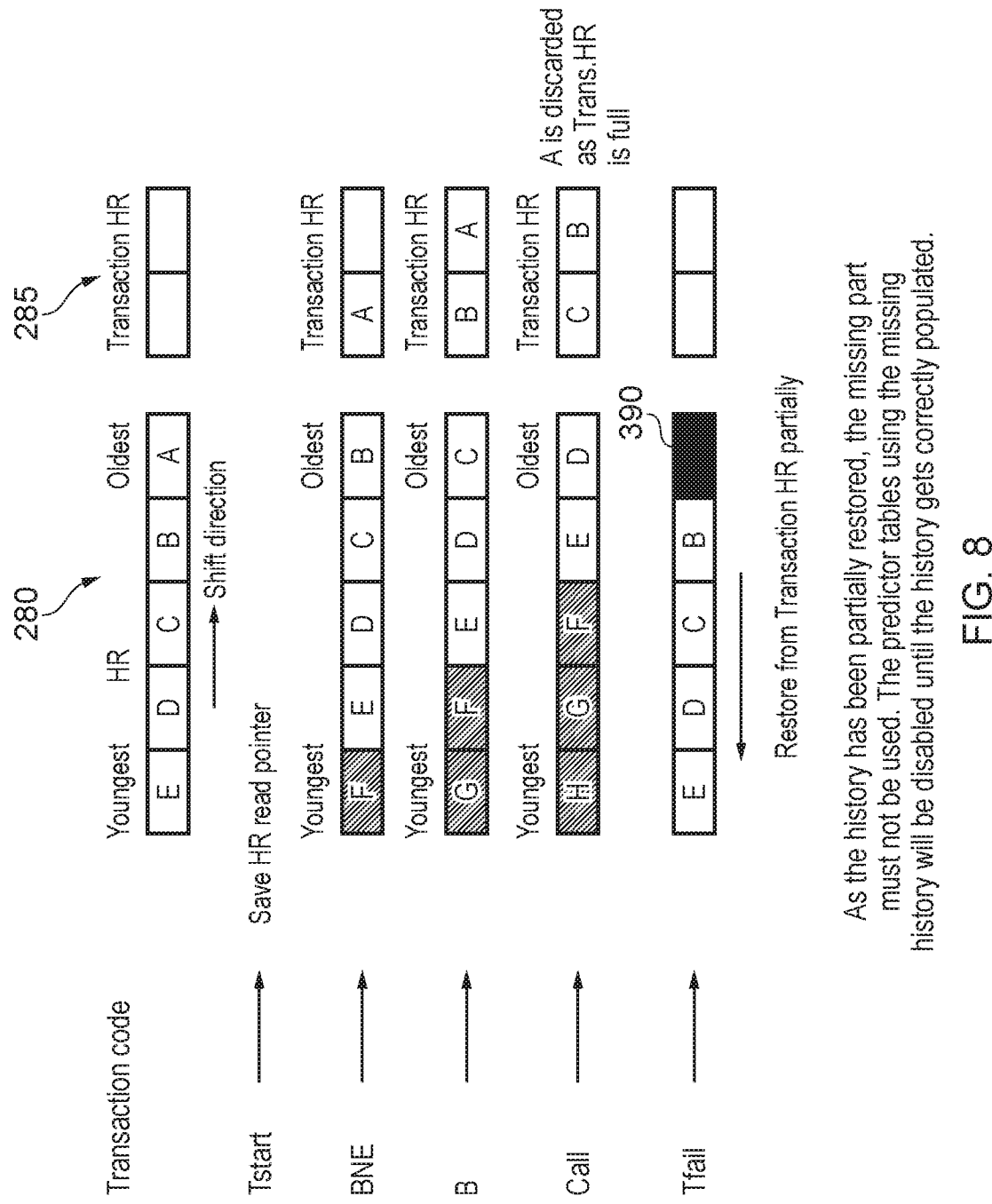
FIG. 8 is a diagram schematically illustrating how the recovery storage contents are used in situations where more items of relevant prediction information have been evicted from the history register during the transaction than can be restored using the contents of the recovery storage.

This process is shown in FIG. 8, which corresponds generally with the earlier described example in FIG. 5, but assumes that three instruction flow changing instructions are encountered during the transaction before the transaction fail point is reached, and as a result the history information for instruction A is discarded from the transaction history register 285. Accordingly, when restoring the contents of the history register, the resultant restored history register will be as shown in the bottom entry in FIG. 8, and the entry 390 will be empty. Hence, any TAGE table which needs to use the item of history information in entry 390 will initially be disabled.

Following step 370, the process proceeds to step 375 shown in FIG. 7B where the prediction circuitry resumes making predictions using the history register. As mentioned earlier, any TAGE table that requires use of the history information within an empty entry (such as entry 390) is initially disabled. However, as indicated by step 380, as each new item of prediction information is added, it is determined whether any initially disabled TAGE tables can be re-enabled. For instance, with reference to the example of FIG. 8, it will be understood that as soon as a new item of prediction information is stored into the history register, then all of the history information will be effectively shifted right, and accordingly the entry 390 will store the history information for instruction B, and accordingly the earlier mentioned disabled TAGE table(s) can be re-enabled. Hence, the TAGE tables are re-enabled as and when possible in order to allow their use by the prediction circuitry when making subsequent predictions.

Figure 9:
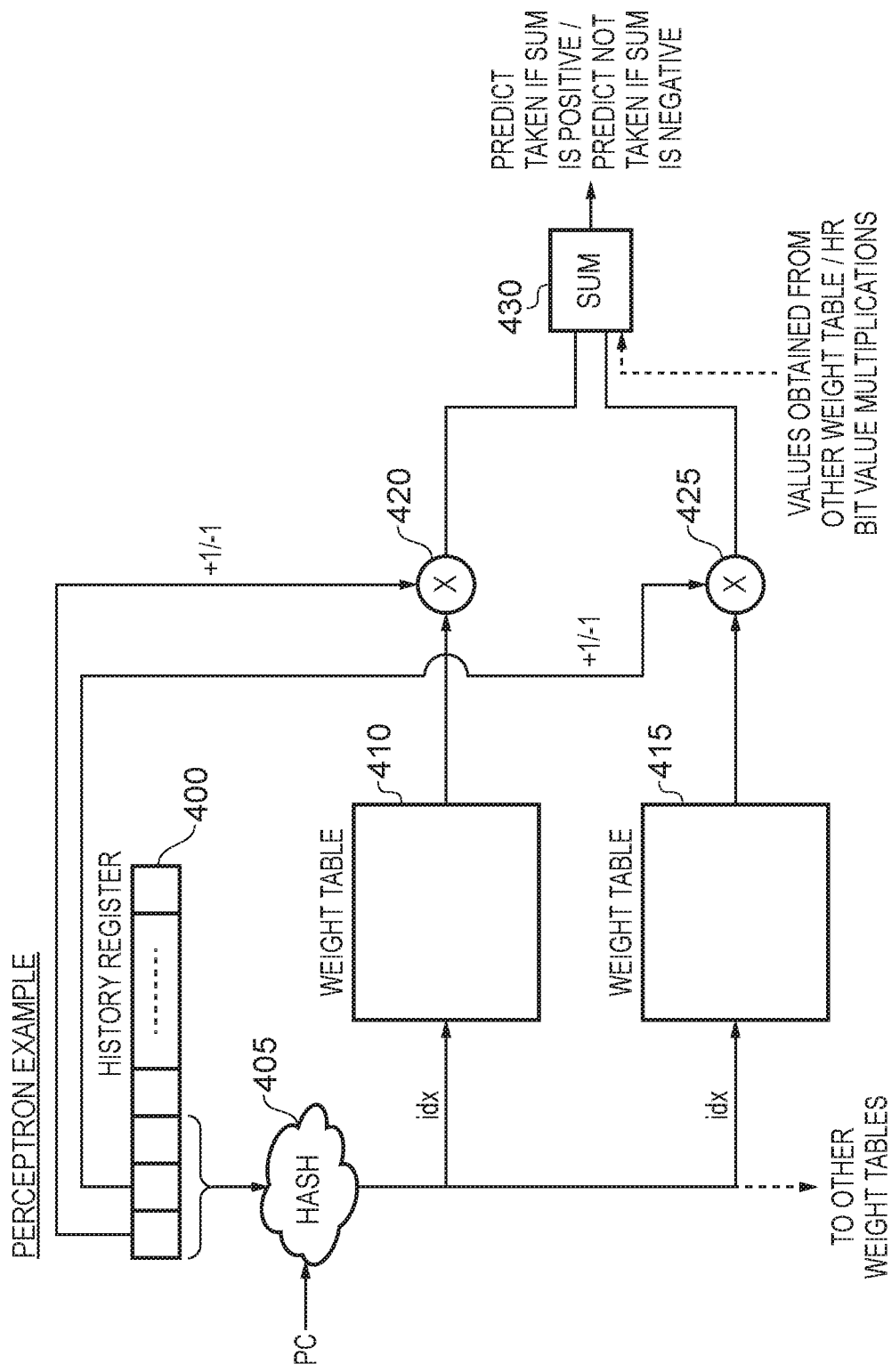
FIG. 9 illustrates an alternative implementation where the prediction storage again takes the form of a history register, but the prediction circuitry takes the form of a perception predictor.

Whilst the above example has been illustrated with reference to a direction predictor based on a TAGE table approach, the same mechanism can be used for other types of branch direction predictor. For example, as illustrated in FIG. 9, a perceptron-based direction predictor may be used as the prediction circuitry 30. In this case, a history register 400 may be provided containing a plurality of items of history information, and the history register 400 may again be arranged as a shift register. In this example, it is assumed that the history register takes the form of a global history where each item of history information indicates whether an associated branch instruction is predicted as taken or not taken. A taken prediction is interpreted as a +1 for the purposes of the multiplication operations 420, 425 performed by the perceptron predictor, whilst a not taken prediction is interpreted as a −1 for such purposes.

As shown in FIG. 9, a certain number of items of prediction information are output to a hash function 405, which also receives the program counter value of the branch instruction for which a prediction is currently to be made, and the hash function uses this information in order to generate an index which is used to index into a plurality of weight tables 410, 415. Each weight table is associated with a corresponding item of history information within the history register. For the sake of simplicity, only two weight tables are shown in FIG. 9, these being associated with the two most recent items of history information in the history register, but in other implementations more weight tables can be added, and indeed if desired there can be a separate weight table for each item of history information in the history register. However, as is apparent from FIG. 9, in the example shown, irrespective of the number of weight tables provided, the same number of items of history information are used as an input to the hash function in order to generate an index into all of those weight tables.

The index is used to identify a particular entry in each weight table 410, 415 containing a weight value, and that weight value is output to a corresponding multiplication circuit 420, 425, which multiplies that weight value by the +1/−1 value obtained from the history register entry content. The resultant values are then forwarded to summation circuitry 430 which sums together all of those values in order to produce an output value which is either positive or negative. In the implementation shown, if the output is positive, then the prediction circuitry predicts the branch instruction as taken, whereas if the output is negative the branch prediction circuitry predicts the branch instruction as not taken.

The approach of FIG. 9 can also be used in situations where the history register takes the form of a path history, where each item of prediction information comprises multiple bits. In that instance, each bit of information is associated with a corresponding weight, and the value of that bit is used to determine the +1/−1 factor used to multiply the associated weight by.

Whilst in FIG. 9 the direction predicting resources are different, in that in the FIG. 9 approach each direction predicting resource is a weight table, whereas in the earlier discussed example of FIGS. 4A and 4B each direction predicting resource is a TAGE table, the same mechanism of operation of the transaction history register 285 can be utilised in association with the history register in order to capture evicted items of history information so that they can later be restored back to the history register in the event of a transaction abort.

Whilst in the examples discussed earlier with reference to FIGS. 4A to 9, the prediction storage has taken the form of a history register, and the prediction circuitry is used to produce a direction prediction for a branch instruction, the techniques described herein can also be used for other forms of prediction storage and prediction circuitry. By way of example, the following text will discuss the use of a return stack used to predict target addresses for return instructions, a return instruction being an example of an instruction flow changing instruction. Hence, in this example the prediction storage takes the form of the return stack, and the prediction circuitry is used to predict target addresses for instruction flow changing instructions, and in this particular instance for return instructions. A return instruction is typically associated with an earlier call instruction, where the call branches to a target address containing some target code, and then following execution of that target code a return instruction is used to return back to the instruction immediately following the call instruction.

To enable the prediction circuitry to predict target addresses for the return instructions, the apparatus may be arranged so that when a call instruction is encountered, and a prediction is made of the target address for the call instruction, then the return address to be associated with that call instruction can be stored on to a return stack to be used as the predicted target address for the associated return instruction. When in due course the return instruction is encountered within the instruction stream, then the return stack can be accessed in order to determine the address to be used as the target address for the return instruction.

Typically, whilst the address from the return stack is used at this stage, it remains on the return stack and is only removed from the return stack when the return instruction is actually committed by the processing circuitry. If that return instruction is inside a transaction, and the transaction ultimately fails, it will be appreciated that having popped the return address from the return stack, that information will typically not be recoverable following the transaction fail, which in certain situations can lead to significant performance issues with regard to predictions made when the transaction is retried. However, taking a snapshot of the entire return stack prior to starting a transaction can give rise to significant performance and area issues, in much the same way as discussed earlier for the history register example. Instead, as will be discussed in more detail herein, a recovery storage mechanism can be implemented in much the same way as discussed earlier for the history register, to allow the relevant popped return addresses to be stored into a recovery storage so that they can later be restored back to the return stack if needed.

Figure 10:
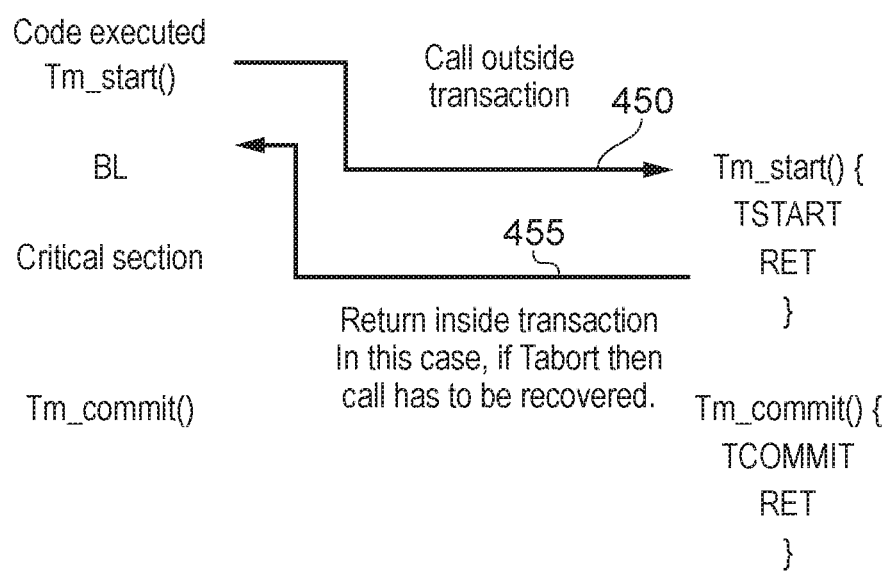
FIG. 10 illustrates an implementation where the prediction storage is used to store return addresses, and the prediction circuitry is used to generate predicted target addresses for return instructions, and in particular illustrates a problematic scenario that can be addressed using the recovery storage technique described herein.

However, prior to discussing the recovery mechanism, a discussion will first be provided of FIG. 10, which illustrates a particularly problematic scenario that could potentially lead to systematic incorrect predictions for return addresses (i.e. target addresses for return instructions) when a transaction is retried following a transaction fail, but for which such an issue can be alleviated through the use of the recovery mechanism described herein. As shown in FIG. 10, the transaction is started by making a call from outside of the transaction, as indicated by the arrow 450. In accordance with the discussion earlier, when making a prediction for the target address of the call instruction, the return address will also be computed and will be pushed on to the return stack, so that it can be used as the predicted target address for the associated return instruction when that return instruction is later encountered. As shown by the arrow 455, when the return is subsequently encountered, the target address can be obtained from the return stack and used to branch to the required code used to implement the transaction. The relevant transaction code will then be executed, and when a transaction commit point is reached, this will typically cause another branch to code used to implement the transaction commit process, whereafter the code will return to code outside of the transaction.

As will be apparent from FIG. 10, the original call instruction is outside of the transaction, but the associated return instruction is inside of the transaction. If that return is committed by the processing circuitry, and accordingly the associated return address information is popped from the return stack, but then in due course the transaction fails, it will be appreciated that when the transaction is retried the original call instruction is not re-executed, since that call instruction is outside of the transaction, and accordingly the relevant return address for the return is not pushed on to the return stack.

As a result, when the prediction circuitry seeks to make predictions for any return instruction encountered within the transaction when the transaction is retried, it will systematically make incorrect predictions due to the return stack holding the incorrect information, and this can very significantly impact the performance when retrying the transaction. It should be noted that this does not cause incorrect behaviour ultimately, since the processing circuitry is able to obtain the correct return address from its link register, but the incorrect predictions cause the wrong instructions to be fetched and hence have a significant performance impact.

Figure 11A:
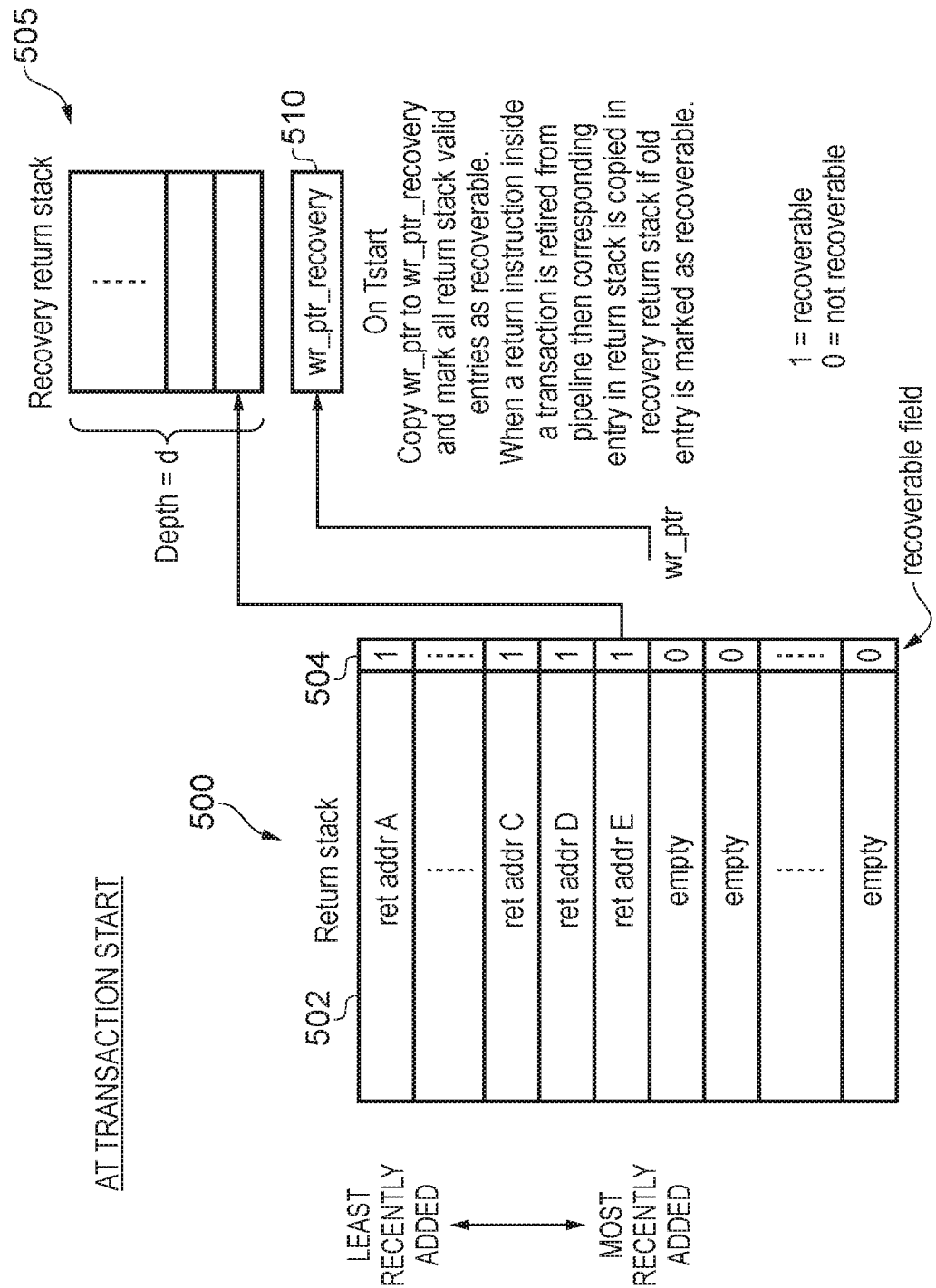
FIGS. 11A to 11C illustrate an implementation where the prediction storage takes the form of a return stack used to store return addresses for return instructions, and the recovery storage takes the form of a recovery return stack, and indicate how the recovery return stack can be used to repopulate the return stack upon a transaction abort.
Figure 11B:
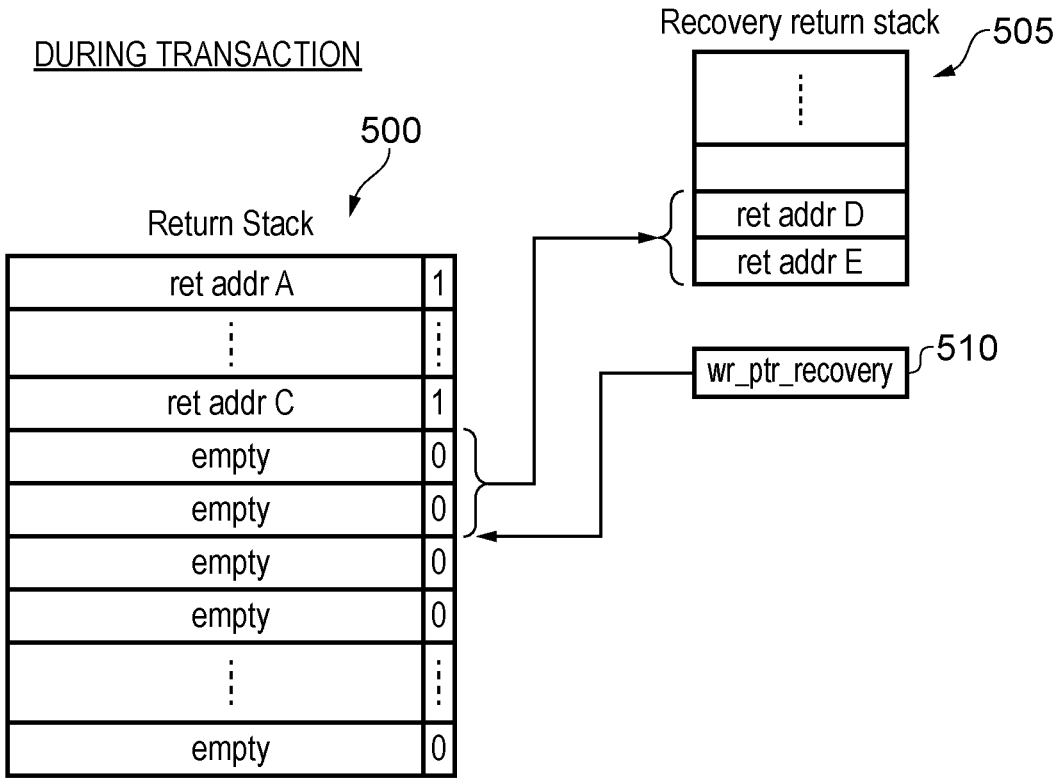

FIG. 11A illustrates the mechanism that may be employed in accordance with the techniques described herein in order to alleviate this issue. The return stack 500 has a plurality of entries, where each entry has a field 502 for storing a return address, and also has an additional field 504 referred to herein as a recoverable field. Typically the value is cleared within the recoverable field of each entry, and until transactional code is being executed the field is not used. However, at the transaction start point, the current write pointer for the return stack 500 is stored into the write pointer recovery storage element 510, this pointer identifying the most recently added return address. Further, every location storing a valid return address at the transaction start point is marked as being a recoverable location by setting the associated recoverable field. Hence, this will identify as recoverable every entry that stores a return address that has been populated by a call instruction, but for which the associated return instruction has not yet been committed, and accordingly the return address has not been popped from the stack. In the example of FIG. 11A, this causes the entries shown in FIG. 11A as storing valid return addresses to have their recoverable field set equal to 1, in this particular example illustration it being assumed that a value of 1 indicates that the entry is recoverable, and a value of 0 indicates that it is not recoverable. At this stage, the recovery return stack 505 is enabled, but initially contains merely empty entries. As shown in FIG. 11B, as each return address is popped from the return stack, an assessment is made as to whether its associated recoverable field is set to 1, and if so that return address is forwarded to the recovery return stack 505. Hence, by way of example, if one or more calls and associated returns within the transaction caused additional return addresses to be pushed on to the return stack (i.e. into entries that were initially empty at the start of the transaction and hence had their field set as non-recoverable, then when those return addresses are popped from the stack they will not be forwarded to the recovery return stack. However, for any entry that stored a valid return address at the transaction start time, and hence had the recoverable field set equal to 1, then when that entry is popped from the return stack the return address will be forwarded to the recovery return stack. In the example illustrated in FIG. 11B, it is assumed that the return addresses E and D are popped from the return stack, and accordingly are stored in the recovery return stack.

Figure 11C:
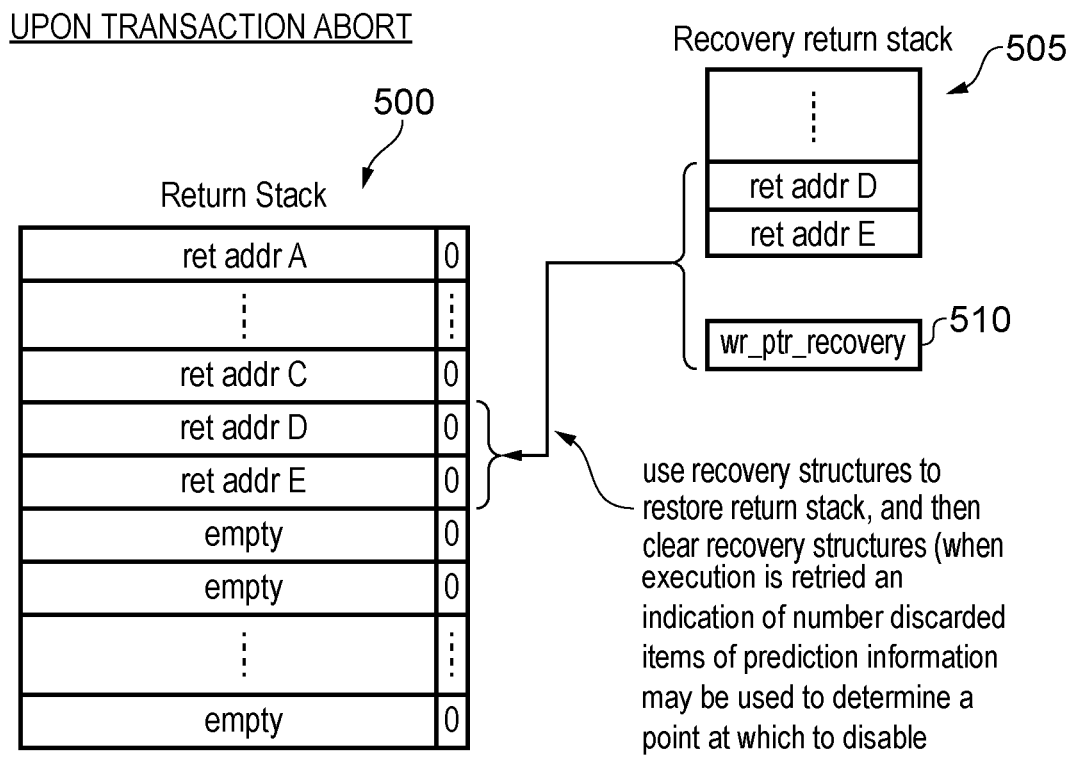

As indicated in FIG. 11C, if the transaction aborts without reaching the commit point, then the write pointer stored in the recovery storage element 510 is used to identify the entries to which the return addresses stored within the recovery return stack 505 should be written back into the return stack 500. In this example, this enables the return stack 500 to be restored directly to the form that existed prior to the transaction start, and at this point the recoverable field in every entry is re-initialised since at this point the current attempt to execute the transaction has completed. The contents of the recovery return stack 505 and the write pointer recovery storage element 510 can then be cleared, with those structures then being re-enabled when the transaction is re-attempted.

In much the same way as the earlier-discussed history register and associated recovery storage, the recovery return stack 505 can have less entries than the return stack 500 itself, and in many instances it has been found that a relatively small recovery return stack provides sufficient entries to enable the return stack to be fully restored in most practical use cases. However, if during execution of the transaction more return addresses are popped from recoverable locations in the return stack than can be accommodated within the recovery return stack, then the recovery return stack 505 is arranged to retain the least recently popped return addresses, as those are the return addresses most recently added to the return stack before the transaction start time. In contrast with the earlier-described example of the history register, in one example implementation no record is kept of the number of return addresses that are discarded from the recovery return stack 505. In such a scenario, this means that when the recovery return stack is used to seek to restore the state of the return stack 500 following a transaction abort, the return stack contents will only partially be restored. It should be noted that, in one implementation, the return addresses are stored into contiguous locations in the return stack when they are restored, and the write pointer stored in the recovery storage element 510 may be adjusted when any return address is discarded so as to ensure that the return stack is restored in a manner such that the return addresses are stored in contiguous locations. For example, if the recovery return stack 505 has two entries and returns addresses E, D and C are popped from the return stack 500 during the transaction prior to the abort point, then return address C will be discarded and the restored content of the return stack will contain return addresses A, B, D and E at contiguous locations in the return stack.

If any return addresses are discarded by the recovery return stack during the transaction, then from the above discussion is will be clear that they will relate to older return addresses (i.e. return addresses added into the return stack a longer time before the transaction start point) than those retained by the recovery return stack and then restored into the return stack. This means that whilst in the initial phase of re-executing the transaction, accurate predictions of return addresses will be made using the information restored into the return stack from the recovery storage, at some point the prediction circuitry will start to make mispredictions due to the lost information that was not restored.

Whilst in one example implementation this is considered acceptable, as the benefit of obtaining accurate predictions during the earlier part of re-execution of the transaction is still obtained, in an alternative implementation steps can be taken to disable the prediction of target addresses for return instructions at an appropriate point during re-execution of the transaction. In particular, the recovery return stack may be arranged to maintain an indication of the number of items of prediction information discarded by the recovery return stack. In such an implementation, the prediction circuitry may be arranged, following recovery of the return stack using the recovery return stack in response to the transaction being aborted, and when execution of the transaction is retried, to use that indication (in combination with knowledge of how many return addresses were restored from the recovery return stack) to determine a point at which to disable prediction of target addresses for return instructions using the return addresses held in the return stack. Hence, based on information about which return addresses have been discarded, the prediction circuitry can be arranged to decide when it is appropriate to stop making predictions of return addresses during re-performance of the transaction. However, a benefit is still obtained from using the recovery return stack since accurate predictions can still be made during the first part of the transaction when it is re-executed, using the return addresses that were restored into the return stack from the recovery return stack.

Figure 12A:
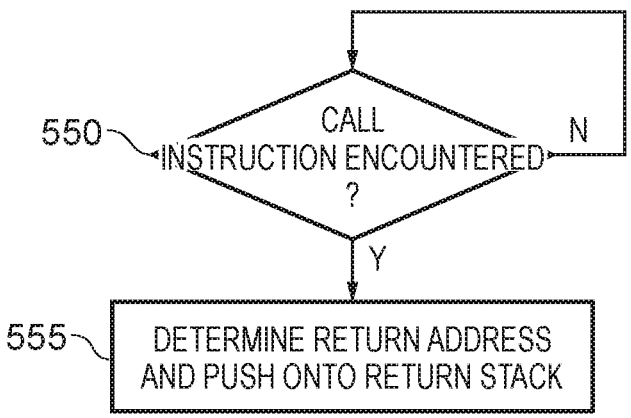
FIGS. 12A to 12C are flow diagrams illustrating how the return stack is used in one example implementation.
Figure 12B:
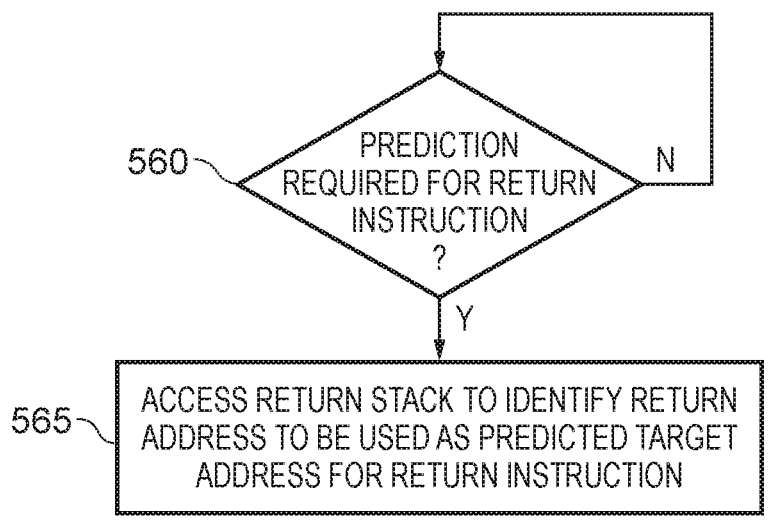
Figure 12C:
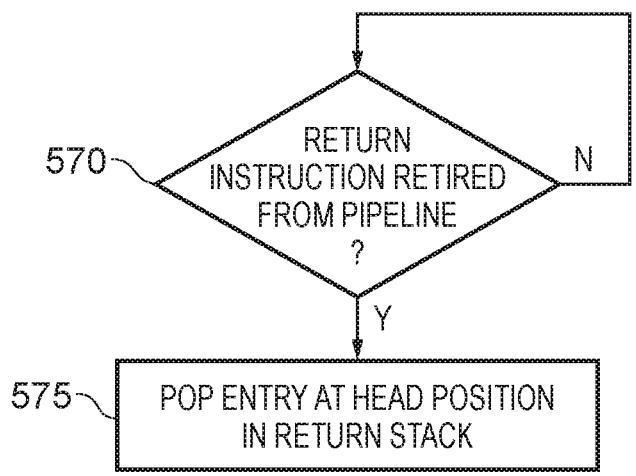

FIGS. 12A to 12C schematically illustrate how the return stack is populated, and its contents used. FIG. 12A illustrates when return addresses are stored on to the return stack. At step 550, it is determined whether a call instruction has been encountered. When the call instruction is encountered, then the return address for that call instruction is determined, and pushed on to the return stack at step 555. In one example implementation, a single return stack is used, and hence the entry on the return stack is made at the time a prediction is made of the target address for the call instruction, when that call instruction is reviewed by the prediction circuitry 30 in FIG. 1. However, in an alternative implementation there may be both a speculative return stack and a committed return stack, and in that instance it is the committed return stack that has the associated recovery return stack associated with it, and that operates in the manner discussed earlier with reference to FIGS. 11A to 11C. When both speculative and committed return stacks are used, then at the time of making a prediction for the call instruction, the determined return address may be placed on to the speculative return stack. When in due course that call instruction is committed by the processing pipeline, and hence the call instruction is retired, then the return address is moved from the speculative return stack to the committed return stack.

FIG. 12B illustrates how the contents of a return stack are used to make a prediction for a return instruction. When at step 560 the prediction circuitry 30 determines that a return instruction has been fetched, and a prediction of the target address for that return instruction needs to be made, then at step 565 the prediction circuitry can access the return stack to identify the return address to be used as the predicted target address for the return instruction. It should be noted at this time, that the return address itself is not popped from the stack, and instead remains on the stack until in due course the return instruction is retired from the pipeline.

As mentioned above, in the event that there is both a speculative return stack and a committed return stack, then the techniques described herein with reference to FIGS. 11A to 11C are employed in respect of the committed return stack. The prediction required at step 565 may be made with reference to the contents of the speculative return stack or the committed return stack, dependent on whether the associated call instruction has yet been retired, and hence whether the return address is currently within the speculative return stack or the committed return stack.

FIG. 12C illustrates when entries are popped from the return stack. When at step 570 a return instruction is retired from the pipeline, and hence the execution of that return instruction has been committed, then at that point an entry at the head position in the return stack is popped at step 575. In accordance with the earlier discussion, the head position in the return stack is identified with reference to the write pointer for the return stack.

With regard to the general operation of the return stack and recovery return stack, the earlier-discussed process of FIG. 3 may still be performed. However, as indicated by FIG. 13, step 105 of FIG. 3 is replaced by step 580 shown in FIG. 13. In particular, at step 580, the current write pointer for the return stack is stored as the restore pointer in the recovery storage, this identifying the location in the stack associated with the most recently added return address. Further, as discussed earlier all entries containing valid return addresses at the transaction start point are marked as recoverable, to enable a determination to be made when return addresses are subsequently popped from the return stack as to whether those return addresses need to be stored within the recovery return stack or not.

The rest of the process illustrated in FIG. 3 can then be performed as discussed earlier. It should be noted that at step 120 of FIG. 3 the determination as to whether a removed item (i.e. a popped return address from the return stack) was in the return stack at the transaction start point can be made by determining if the associated entry is marked as recoverable or not.

From the above described examples, it will be appreciated that the techniques described herein provide a very efficient mechanism for enabling the contents of a prediction storage referenced by prediction circuitry to be restored following a transaction fail, but without the area or performance issues associated with taking a complete snapshot of that prediction storage at the transaction start time. A recovery storage is provided that can be progressively filled during the course of the transaction as and when required, and then referenced in the event of a transaction fail to seek to restore the contents of the prediction storage.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
processing circuitry to perform data processing operations in response to instructions, the processing circuitry comprising transactional memory support circuitry to support execution of a transaction, the transaction comprising a sequence of instructions executed speculatively and for which the processing circuitry is configured to prevent commitment of results of the speculatively executed instructions until the transaction has reached a transaction end point;
prediction circuitry to generate predictions in relation to instruction flow changing instructions, with the generated predictions being used to determine the instructions fetched for execution by the processing circuitry;
prediction storage to store a plurality of items of prediction information that are referenced by the prediction circuitry when generating the predictions, wherein the items of prediction information maintained by the prediction storage change based on the instructions being executed by the processing circuitry; and
a recovery storage activated by the transactional memory support circuitry at a transaction start point to store a restore pointer identifying a chosen location in the prediction storage, and between the transaction start point and the transaction end point to receive any item of prediction information removed from the prediction storage that was present in the prediction storage at the transaction start point; wherein:
the recover storage and the prediction storage are separate elements;
the transactional memory support circuitry is responsive to the transaction being aborted to reference the restore pointer in order to discard from the prediction storage any items of prediction information added to the prediction storage after the transaction start point, and to store back into the prediction storage any items of prediction information stored in the recovery storage;
the prediction storage is arranged to store, as the items of prediction information, history information indicative of instruction flow for a number of previously encountered instruction flow changing instructions; and
the prediction circuitry is arranged to generate direction predictions for the instruction flow changing instructions, during which an entry in each of a plurality of direction predicting resources are identified using an associated group of items of prediction information maintained within the prediction storage.

2. An apparatus as claimed in claim 1, wherein the prediction storage has a capacity sufficient to store up to N items of prediction information and the recovery storage has a capacity sufficient only to store M items of prediction information, where M is less than N.

3. An apparatus as claimed in claim 2, wherein:
the recovery storage is arranged to store up to M items of prediction information that were present in the prediction storage at the transaction start time; and
when more than M items of prediction information that were present in the prediction storage at the transaction start point are removed from the prediction storage during execution of the transaction, the recovery storage is arranged to retain the M removed items of prediction information that were most recently added to the prediction storage before the transaction start point.

4. An apparatus as claimed in claim 3, wherein when more than M items of prediction information are received from the prediction storage during execution of the transaction, the recovery storage is arranged to maintain an indication of the number of items of prediction information discarded by the recovery storage.

5. An apparatus as claimed in claim 1, wherein the restore pointer is arranged to identify as the chosen location that location which, at the transaction start point, stores the item of prediction information most recently stored into the prediction storage.

6. An apparatus as claimed in claim 1, wherein if all of the items of prediction information present in the prediction storage at the transaction start point are removed from the prediction storage during execution of the transaction, the recovery storage is arranged not to store any subsequently removed items of prediction information.

7. An apparatus as claimed in claim 1, wherein the instruction flow changing instructions are branch instructions, and the history information is updated in dependence on the direction predictions made by the prediction circuitry for the branch instructions.

8. An apparatus as claimed in claim 1, wherein:
the prediction storage is arranged to operate as a shift register to store N items of prediction information, and when a new item of prediction information is added to the prediction storage in a condition where the prediction storage is full, the oldest item of prediction information is evicted from the prediction storage; and
the recovery storage is arranged during execution of the transaction to receive each item of prediction information evicted from the prediction storage, when that item of prediction information was present in the prediction storage at the transaction start point.

9. An apparatus as claimed in claim 8, wherein:
the recovery storage is arranged to operate as a shift register to store up to M items of prediction information evicted by the prediction storage during execution of the transaction, where M is less than N; and
when the number of items of prediction information evicted by the prediction storage during execution of the transaction exceeds M, the recovery storage is arranged to discard older evicted items of prediction information such that the recovery storage stores the most recently evicted M items of prediction information that were present in the prediction storage at the transaction start time.

10. An apparatus as claimed in claim 9, wherein:
the recovery storage is arranged to maintain an indication of the number of items of prediction information discarded by the recovery storage; and
the transactional memory support circuitry is responsive to abortion of the transaction causing the storing back into the prediction storage of any items of prediction information stored in the recovery storage, to use the indication of the number of items of prediction information discarded by the recovery storage to determine which of the plurality of direction predicting resources are initially ignored by the prediction circuitry when the prediction circuitry resumes making direction predictions using the prediction storage.

11. An apparatus as claimed in claim 10, wherein the prediction circuitry is arranged to initially ignore any direction predicting resource whose associated group of items of prediction information is incomplete following the restoring of the prediction storage using the items of prediction information stored in the recovery storage.

12. An apparatus as claimed in claim 10, wherein the indication of the number of items of prediction information discarded by the recovery storage is used to initiate a counter that is adjusted each time the prediction circuitry adds a new item of prediction information to the prediction storage, and is used by the prediction circuitry to determine when each initially ignored direction predicting resource is reutilised by the prediction circuitry.

13. An apparatus as claimed in claim 1, wherein the prediction circuitry operates as a TAGE (Tagged Geometric length) predictor, the plurality of direction predicting resources are a plurality of direction predicting tables, and each direction predicting table is associated with a different group of items of prediction information maintained within the prediction storage.

14. An apparatus as claimed in claim 1, wherein the prediction circuitry operates as a perceptron predictor, the plurality of direction predicting resources are a plurality of weight tables, and the entry identified in each weight table is identified using the same group of items of prediction information maintained within the prediction storage.

15. An apparatus comprising:
processing circuitry to perform data processing operations in response to instructions, the processing circuitry comprising transactional memory support circuitry to support execution of a transaction, the transaction comprising a sequence of instructions executed speculatively and for which the processing circuitry is configured to prevent commitment of results of the speculatively executed instructions until the transaction has reached a transaction end point;
prediction circuitry to generate predictions in relation to instruction flow changing instructions, with the generated predictions being used to determine the instructions fetched for execution by the processing circuitry;
prediction storage to store a plurality of items of prediction information that are referenced by the prediction circuitry when generating the predictions, wherein the items of prediction information maintained by the prediction storage change based on the instructions being executed by the processing circuitry; and
a recovery storage activated by the transactional memory support circuitry at a transaction start point to store a restore pointer identifying a chosen location in the prediction storage, and between the transaction start point and the transaction end point to receive any item of prediction information removed from the prediction storage that was present in the prediction storage at the transaction start point; wherein:
the recover storage and the prediction storage are separate elements;
the transactional memory support circuitry is responsive to the transaction being aborted to reference the restore pointer in order to discard from the prediction storage any items of prediction information added to the prediction storage after the transaction start point, and to store back into the prediction storage any items of prediction information stored in the recovery storage;
the prediction storage is arranged to store, as the items of prediction information, predicted target addresses for return instructions;
the prediction circuitry is target address prediction circuitry used to generate, as the predictions, predicted target addresses for return instructions;
each return instruction is provided in association with an earlier call instruction;
the prediction storage is arranged as a return stack, and in association with each encountered call instruction a return address for the call instruction is determined and pushed onto the return stack to form the predicted target address for the associated return instruction;
the processing circuitry is responsive to completing execution of a return instruction to pop a return address from the return stack;
the recovery storage is arranged to store as the restore pointer a pointer identifying a location in the return stack storing the most recently added return address, and is arranged to mark every location storing a valid return address at the transaction start point as being a recoverable location;
each time during execution of the transaction a return address is popped from a recoverable location in the return stack, the recovery storage is arranged to receive that return address;

the recovery storage has capacity to store M return addresses;

when during execution of the transaction more than M return addresses are popped from recoverable locations in the return stack, the recovery storage is arranged to retain the least recently popped M return addresses;

the recovery storage is arranged to maintain an indication of the number of items of prediction information discarded by the recovery storage; and the prediction circuitry is arranged, following recovery of the prediction storage using the recovery storage in response to the transaction being aborted, and when execution of the transaction is retried, to use said indication to determine a point at which to disable prediction of target addresses for return instructions using the return addresses held in the return stack.

16. A method of handling prediction information, comprising:

employing processing circuitry to perform data processing operations in response to instructions, the processing circuitry comprising transactional memory support circuitry to support execution of a transaction, the transaction comprising a sequence of instructions executed speculatively and for which the processing circuitry is configured to prevent commitment of results of the speculatively executed instructions until the transaction has reached a transaction end point;

generating predictions in relation to instruction flow changing instructions, with the generated predictions being used to determine the instructions fetched for execution by the processing circuitry;

storing in prediction storage a plurality of items of prediction information that are referenced when generating the predictions, wherein the items of prediction information maintained by the prediction storage change based on the instructions being executed by the processing circuitry;

activating a recovery storage at a transaction start point to store a restore pointer identifying a chosen location in the prediction storage, and between the transaction start point and the transaction end point to receive any item of prediction information removed from the prediction storage that was present in the prediction storage at the transaction start point, wherein the recovery storage and the prediction storage are separate elements; and in response to the transaction being aborted, causing the transactional memory support circuitry to reference the restore pointer in order to discard from the prediction storage any items of prediction information added to the prediction storage after the transaction start point, and to store back into the prediction storage any items of prediction information stored in the recovery storage; wherein the prediction storage is arranged to store, as the items of prediction information, history information indicative of instruction flow for a number of previously encountered instruction flow changing instructions; and the generating of predictions comprises generating direction predictions for the instruction flow changing instructions during which an entry in each of a plurality of direction predicting resources are identified using an associated group of items of prediction information maintained within the prediction storage.

* * * * *